(12) United States Patent
Romano et al.

(10) Patent No.: US 6,219,154 B1
(45) Date of Patent: Apr. 17, 2001

(54) EXPOSURE CONTROL TECHNIQUE FOR IMAGESETTING APPLICATIONS

(76) Inventors: David J. Romano, 60B Billerica St., Lowell, MA (US) 01852; Brian P. Alterio, 61 Chandler St., Arlington, MA (US) 02174

(*) Notice: Subject to any disclaimer, the term of this patent is extended or adjusted under 35 U.S.C. 154(b) by 0 days.

(21) Appl. No.: 08/800,937

(22) Filed: Feb. 13, 1997

(51) Int. Cl.[7] ............................................. H04N 1/40
(52) U.S. Cl. ......................... 358/1.9; 358/456; 358/406; 355/51; 355/72
(58) Field of Search ................................. 358/298, 455, 358/456, 457, 458, 459, 406, 504, 1.9; 399/51, 72, 177, 181

(56) References Cited

U.S. PATENT DOCUMENTS

| | | |
|---|---|---|
| 4,004,923 | 1/1977 | Hensel . |
| 4,183,990 | 1/1980 | Uchida et al. . |
| 4,310,248 | 1/1982 | Meredith . |
| 4,419,426 | 12/1983 | Kehl . |
| 4,504,141 | 3/1985 | Yamakoshi . |
| 4,588,298 | 5/1986 | Nakamura . |
| 4,693,592 | * 9/1987 | Kurpan .................. 399/72 |
| 4,852,485 | 8/1989 | Brunner . |
| 5,031,534 | 7/1991 | Brunner . |
| 5,170,257 | 12/1992 | Burns . |
| 5,245,443 | 9/1993 | Burns . |
| 5,493,321 | 2/1996 | Zwaldo . |
| 5,619,307 | * 4/1997 | Machino et al. ............ 399/72 |
| 5,636,330 | 6/1997 | Barak . |
| 5,689,762 | * 11/1997 | Hamaguchi ................ 399/51 |

FOREIGN PATENT DOCUMENTS

| | | |
|---|---|---|
| 681929A5 | 6/1993 | (CH) . |
| 0518559A | 6/1992 | (EP) . |
| 0518525 | 12/1992 | (EP) . |
| 2206868 | 5/1974 | (FR) . |

OTHER PUBLICATIONS

Franz Sigg and David Romano, Society for Imaging Science and Technology, Proceedings of the Fourth Technical Symposium on Prepress Proofing and Printing, Oct. 1995, pp. 88–92, entitled "How to Calibrate and Linearize an Imagesetter Using the Digital UGRA/FOGRA Wedge".
Schmitt, "Fogra Mitt", 43(148);22–24 (Aug. 1994).
Schmitt, "Fogra Mitt", 42(147);19–26 (Dec. 1993).
Munger, K., "The UGRA/FOGRA Digital Control Wedge and Its Application", pp. 48–61.
"GAFT/Systems of Merritt, Digital Plate Control Target".
Sabotka et al., "A Special VFG–GLV Test Target for Postscript Output devices", pp. 63–74.
R. Allen, "Registration method for providing high visual magnification of micro–position errors", Color Hard Copy and Graphic Arts II, SPIE Proceedings Series, vol. 3018, pp. 389–397, Feb. 1997.
R. Levien, "Highly sensitive register mark based on moire patterns", Color Hard Copy and Graphic Arts II, SPIE Proceedings Series, vol. 1912, pp. 423–427, Feb. 1993.
R. Allen, "Visual Tools, Image Quality Measurement without Instrumentation", Sep. 7–11, 1998 pp. 168–173 (ICPS 1998) vol. 2 of Proceedings.

\* cited by examiner

*Primary Examiner*—Thomas D. Lee
(74) *Attorney, Agent, or Firm*—Alfred A. Stadnicki; Edward L. Kelley

(57) ABSTRACT

An article of manufacture includes a medium having a plurality of checkerboard patches recorded thereon. Each of the patches is of equal nominal tint and formed of dots. The dots of each of the patches are of equal nominal size with the size being different from that of the dots forming all other patches. One of the patches is arranged adjacent to all other patches.

48 Claims, 12 Drawing Sheets

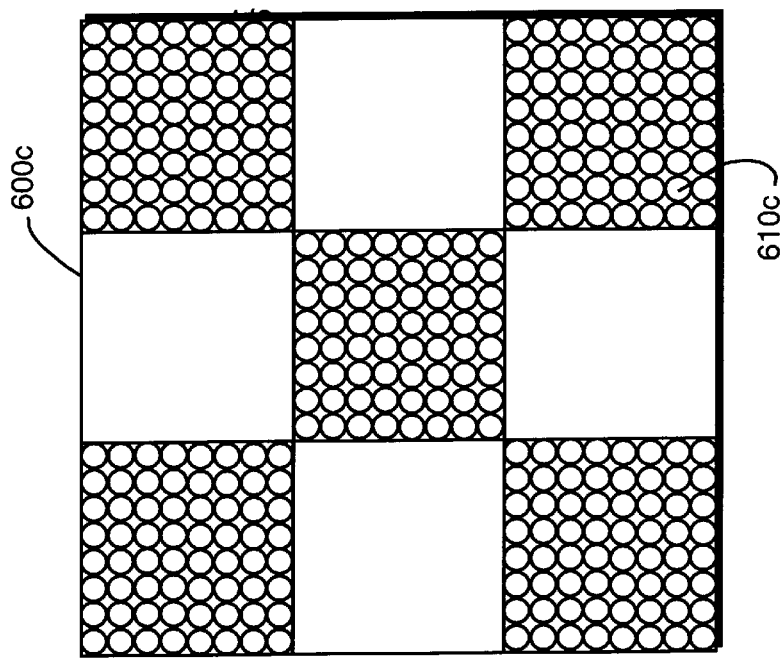
FIG. 6C
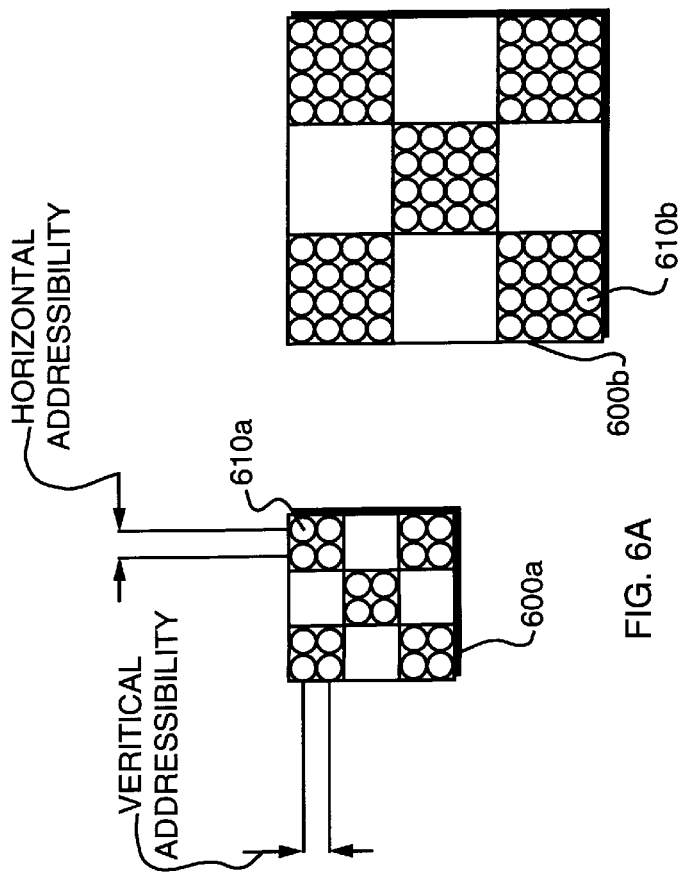
FIG. 6B
FIG. 6A

| CHECKERBOARD | LUT | | | | | | | | | | | | |
|---|---|---|---|---|---|---|---|---|---|---|---|---|---|
| | 140 | 145 | 150 | 155 | 160 | 165 | 170 | 175 | 180 | 185 | 190 | 200 |
| 1 | 0.983 | 0.9885 | 0.994 | 0.9655 | 0.937 | 0.741 | 0.527 | 0.404 | 0.3565 | 0.309 | 0.303 | 0.291 |
| 2 | 0.951 | 0.9005 | 0.85 | 0.788 | 0.726 | 0.625 | 0.543 | 0.485 | 0.447 | 0.409 | 0.397 | 0.377 |
| 3 | 0.85 | 0.797 | 0.744 | 0.7025 | 0.661 | 0.601 | 0.553 | 0.517 | 0.4895 | 0.462 | 0.457 | 0.441 |
| 4 | 0.792 | 0.745 | 0.698 | 0.666 | 0.634 | 0.591 | 0.555 | 0.527 | 0.5065 | 0.486 | 0.48 | 0.468 |
| 5 | 0.755 | 0.711 | 0.667 | 0.6415 | 0.616 | 0.579 | 0.553 | 0.533 | 0.5165 | 0.5 | 0.496 | 0.486 |
| 6 | 0.736 | 0.6955 | 0.655 | 0.6315 | 0.608 | 0.577 | 0.552 | 0.537 | 0.5235 | 0.51 | 0.506 | 0.495 |
| 7 | 0.719 | 0.682 | 0.645 | 0.622 | 0.599 | 0.571 | 0.55 | 0.537 | 0.5955 | 0.514 | 0.512 | 0.502 |
| 8 | 0.704 | 0.669 | 0.634 | 0.614 | 0.594 | 0.571 | 0.55 | 0.54 | 0.5295 | 0.519 | 0.518 | 0.506 |

FIG. 10

EXPOSURE CONTROL TECHNIQUE FOR IMAGESETTING APPLICATIONS

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

1. Technical Field

The present invention relates to digital platesetting and imagesetting. More particularly, the present invention relates to the establishment and monitoring of the proper exposure setting of an image recording device.

2. Background Art

Modern electronic digital platesetters and imagesetters write or record images for subsequent reproduction at a predefined resolution rate. Such systems may write or record images on various media including, photo or thermal sensitive paper or polymer films, photo or thermal sensitive coatings, erasable imaging materials or ink receptive media mounted onto an image recording surface, polymer film or aluminum based printing plate materials, all used in image reproduction. Such media are mounted onto a recording surface which may be planar or curved.

Conventional digital imagesetters include a raster image processor (RIP) which receives signals representing an image to be recorded on the applicable media and converts the signals into instructions to a scanner which scans the recording media to produce the desired image. It is the function of the RIP to process the received signals representing the image into an instruction set corresponding thereto which will be understood by the scanner.

In an article entitled "How to Calibrate and Linearize an Imagesetter Using the Digital UGRA/FOGRA Wedge" (Franz Sigg and David Romano, Society for Imaging Science and Technology, Proceedings of the Fourth Technical Symposium on Prepress Proofing and Printing, October, 1995, pp. 88–92), which was co-authored by David Romano who is also a co-inventor of the invention described herein, the need for imagesetter predictability and repeatability is discussed. As noted therein, most modern imagesetters require adjustment so that a prespecified solid density associated with the media to be imaged is produced. In most cases, it is required that the imagesetter be adjusted until a solid density within a range of 1.0 to 4.0 or more is obtained on the medium being recorded. A densitometer can be utilized to measure the density of a recorded image to ensure correspondence with the pre-specified density.

In practice, the scanner intensity is often adjusted to change the density of a recorded image. However, because the intensity adjustment does not guarantee that desired dot areas will actually be recorded on the medium, it has been proposed that linearization curves be utilized to further adjust the imagesetter to offset the dot gain on the medium recorded by the imagesetter which is typically experienced as the intensity of the scanner is increased. In this way, the size or number of dots within an image are modified so that the desired dot areas will actually be recorded on the imaged medium. However, utilizing linearization curves does not ensure proper exposure. Although the use of linearization curves, may result in proper dot areas, the adjustments made to obtain the desired density may also result in undesirable dot fringe or fog between the dots on the recorded medium.

In the above referenced article, it is proposed that half-tone patterns formed of one-by-one, two-by-two and four-by-four pixel checkerboards be compared with a 50% half-tone patch to calibrate the imagesetter. More particularly, it was disclosed that the proper imagesetter exposure occurs when the three checkerboards and a 50% half-tone patch have the same darkness or tint and hence the same visual density.

In non-digital platemaking, it is well known to form continuous grey tone wedges with a plurality of continuous tone density patches on a separate sheet of medium to compare with a test or registration patch formed on the recorded medium to initially set the exposure of the platemaker and/or to confirm that each individual sheet of recorded medium includes a test patch which matches the selected patch on the wedge. Such a wedge is depicted in prior art FIG. 1.

As shown in FIG. 1, the wedge 10 includes various continuous tone density patches 20 which are numbered 1–13 on the wedge. The densities of the respective patches vary from 0 to 100%. Other fields, which are not relevant for purposes of the present disclosure, are also included on the wedge 10. The patches 20 are formed on a medium 30 which is preferably of a material substantially similar to the medium to be production imaged and on which the test patch is to be recorded. The platemaker operator is instructed which of the particular step(s) on the wedge 10, and therefore which of the specific patch or patches within the continuous tone density patches 20 the test patch recorded on each piece of production medium must correspond to in order to be acceptable.

In a typical operational setting, a range of steps, e.g. 4, 5 and 6, might be designated for use in initially establishing the exposure setting for the platemaker or in monitoring the acceptability of recorded media and hence the repeatability of the platemaker. The wedge 10 provides a simple way in which to initially set the platemaker exposure and to monitor the quality of recorded media in non-digital platemakers. Although providing a rough indicator for initially establishing an acceptable platemaker exposure setting and for monitoring platemaker repeatability by ensuring that all recorded media is exposed at approximately the same level, the wedge 10 cannot ensure that the recorded test patch actually corresponds to a desired density. In any event, many of the operators now operating digital platesetters and imagesetters were trained on non-digital platemakers and are familiar with the use of the FIG. 1 wedge for quality control.

OBJECTIVES OF THE INVENTION

In view of the above, it is an objective of the present invention to provide an improved technique for calibrating digital platesetters and imagesetters.

It is a further object of the present invention to provide a technique which allows digital platesetter and imagesetter operators to simply and precisely establish the correct exposure for the platesetter or imagesetter prior to production recording of desired images on a medium.

It is a further object of the present invention to provide a technique which allows digital platesetter and imagesetter operators to simply and precisely monitor repeatability of the platesetter or imagesetter using an aid similar to that used in non-digital platemaking.

It is an additional objective of the present invention to provide a technique which allows platesetter and imagesetter operators to visually determine whether or not exposure has been optimally adjusted.

It is still another objective of the present invention to provide a technique which facilitates a precise determination of how close the digital platesetter or imagesetter exposure is to its optimum exposure.

It is yet another objective of the present invention to provide a user friendly technique which allows digital platesetter or imagesetter operators to visually determine the acceptability of characters to be printed on a medium at an exposure level during production operations.

Still a further objective of the present invention is to provide a digital platesetter or imagesetter system with automated exposure monitoring and/or control.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY OF THE INVENTION

In accordance with the present invention, a digital platesetter or imagesetter control wedge is formed by recording a checkerboard pattern, having a plurality of checkerboard patches on a medium. Each of the patches is of equal nominal tint e.g. 50%. The pattern may be imaged in a positive or negative polarity. The dots forming each patch are of equal nominal size but different in size from the dots forming all other patches. Preferably, the checkerboard patches are formed of 1×1 pixel dots, 2×2 pixel dots etc. up through a dot size which is relatively insensitive to intensity changes as established for the platesetting or imagesetting system, e.g. 8×8 pixel dots. The patch reflecting the least positive checkerboard, such as an 8×8 pixel patch, is preferably arranged adjacent to all other patches. It should be recognized that depending upon the implementation, a larger or smaller dot size patch could, if desired, be arranged adjacent to the other patches. This arrangement simplifies visual comparison of the tints of the more sensitive patches, i.e., the patches having the smaller dot sizes, with that of the least sensitive patch, i.e. the patch having the largest dot size.

For ease of use, the patches are arranged in a row with the least sensitive patch disposed along the length of row and adjacent to all other patches. Preferably, each patch in the row is formed of dots, the size of which exceeds the size of the dots of the prior patch in the row by one pixel in each of two orthogonal directions. A visual determination that the tint of the least sensitive patch matches the most sensitive patch in the wedge is indicative that the imager is operating at the correct exposure level.

The control wedge also provides a tool for visually determining the degree to which the actual exposure setting of the platesetting or imagesetting system used in producing the wedge differs from the optimum exposure. More particularly, the location of the most sensitive patch having a tint matching that of the least sensitive patch will provide a relatively precise indicator of the degree error in the system exposure setting. For example, if the patch beginning the row is a checkerboard having a 1 pixel dot size and each successive patch in the row has a 1×1 pixel increase in dot size, should the tints of the least sensitive patch, e.g. an 8×8 pixel patch, match with those patches having a dot size from 3×3 through 7×7 pixels, the operator will know that the exposure is acceptable down to a 3×3 pixel dot size and can therefore gauge whether or not the exposure setting is satisfactory for the intended production recording.

Advantageously, the digital platesetting or imagesetting system is operated at a first exposure setting to create a first control wedge, including checkerboard patches, on the medium, and at a second exposure setting to create a second control wedge, including the same checkerboard patches, on the medium. The selection of the first or second exposure as the preferred exposure of the digital platesetting or imagesetting system for production imaging is determined based upon a comparison of the match of the tints of the patches recorded at the first exposure setting with the match of the tints of the patches recorded at the second exposure setting. If the match is better at the first exposure, then the first exposure is selected and visa-versa. By forming an array of wedges, each at a different exposure setting, a precise determination of the correct exposure setting can be made.

In accordance with still other aspects of the invention, the control wedge may also or alternatively be formed by recording other patterns on the medium. These patterns may include one or more of serif text, hairline, microline and midtone array patterns. These specific patterns are particularly beneficial in providing a visual indication as to how production images, whether graphics or text, recorded at a particular exposure will look to an observer. These latter patterns are preferably imaged in both positive and negative polarities. The microlines are preferably spaced at twice their width in order to provide enhanced visual information as compared to a one pixel-on, one pixel-off pixel arrangement, i.e., spacing equal to the line width. As with the checkerboard pattern, these latter patterns may also beneficially be formed in an array of wedges, each at a different exposure setting, for use in determining the correct exposure setting.

In accordance with yet other aspects of the invention, the wedge may also or alternatively be formed by recording a highlight and/or shadow dot pattern on the medium. As is well known in the art, highlight or shadow dots, depending on whether the medium is of positive or negative polarity, are particularly suitable for checking the maximum or minimum density of an image recordable on the medium for comparison with the pre-specified $D_{max}$ or an assumed $D_{min}$ for the medium.

In its most preferred embodiment, each control wedge includes all of the aforementioned patterns. An array of wedges is recorded on the medium at different exposure settings to initially establish the proper exposure setting for production imaging. A preliminary selection is of the proper exposure for production imaging is made based upon the exposure setting of the particular wedge, within the array of control wedges, having the least sensitive checkerboard patch with a tint that matches the tint of all other checkerboard patches within the wedge. The density of the maximum density highlight dot or minimum density shadow dot within the wedge recorded at the preliminarily selected exposure setting is then determined with, for example, a densitometer. If the density reading is satisfactory, i.e. falls within the $D_{max}$ range established by the manufacturer or the assumed $D_{min}$ range for the medium being recorded, the serif text, hairline, microline and midtone array patterns included in the wedge recorded at the preliminarily selected exposure setting are visually inspected to confirm acceptability of the preliminarily selected exposure setting.

In conventional digital platesetting and imagesetting systems, the image reader generates a digital signal representing an image. The raster image processor (RIP) transforms the digital signal into an imaging signal readably by a platesetter or imagesetter controller. The platesetter or imagesetter is controlled by a controller to expose a medium to record the image in accordance with the imaging signal. A media processor is used to develop, i.e. finish, the exposed medium. The finishing of the exposed medium may be performed by any post imaging process. For example, finishing may include chemical, mechanical, electrical and/or heat treatment of the exposed medium. The finishing may involve, developers, fixers, brushing, lamination, pealing, washing, rinsing, drying and/or any other technique suitable for finishing a latent or patent image recorded on the medium.

In accordance with the present invention, a memory device is provided to store a set of instructions and is interconnected to a computer processor included in either the image reader, RIP or controller of the platesetting or imagesetting system. The computer processor, in accordance with the stored instructions, generates signals responsive to which the imager, i.e. the platesetter or imagesetter, exposes the medium to record the wedge or array of wedges described above on a medium. The exposed medium is then developed such that the wedge patterns on the finished medium are indicative of the combined operation of the imager and the media processor.

To still further automate the system, a densitometer or other sensing device can be included to automatically detect the density of, for example, the maximum density highlight dot or minimum density of the shadow dot, or one patch of the midtone array or one of the checkerboard patches recorded on the finished media. The system exposure setting is then automatically adjusted based upon the detected density such that subsequently exposed media match a target density, i.e., a $D_{max}$ or $D_{min}$ range. In this way, a fully automated closed loop platesetting or imagesetting system is provided.

BRIEF DESCRIPTION OF DRAWINGS

FIG. 6A depicts a 2×2 pixel halftone dot patch.

FIG. 6B depicts a 4×4 pixel halftone dot patch.

FIG. 6C depicts an 8×8 pixel halftone dot patch.

FIG. 10 is a look-up table suitable for use in adjusting the exposure of a platesetting or imagesetting system in accordance with the present invention.

DESCRIPTION OF PREFERRED EMBODIMENT(S)

The present invention relates to a control wedge formed of patterns which can be used to enhance image quality in digital imagesetting and platesetting operations. The wedge is suitable for use in initially establishing, monitoring and automatically adjusting the exposure of digital imagesetting and platesetting systems.

As used in this application, the term "pixel" will be used in the customary manner to describe a single picture element which is the smallest unit of square area which can be exposed by the imagesetting or platesetting device. As will be understood by those skilled in the art, a pixel serves as the smallest building block of all images, whether text and graphics.

The term "addressability" is used to indicate the smallest incremental image which can be formed by the imaging device on a media. Addressability, as is understood in the art, is typically referred to in dots per square inch ("dpi") which is indicative of the smallest possible distance between pixels which are formed on a media by the imagesetting or platesetting device.

The phrase "halftone dot" is used to indicate a configuration of one or more pixels spaced according to the addressability of the imagesetting or platesetting device to represent a particular pattern density.

The term "checkerboard patch" is used to refer to a matrix of halftone dots which form a checkerboard like patch. A checkerboard patch always includes exactly half of its area formed of completely empty spaces and half of its area imaged with halftone dots. The size of the checkerboard patch is expressed as the square of the pixels along the length of one side of one halftone dot. Accordingly, a 4×4 checkerboard patch, for example, contains halftone dots comprised of sixteen (16) square pixels.

Figure 1:
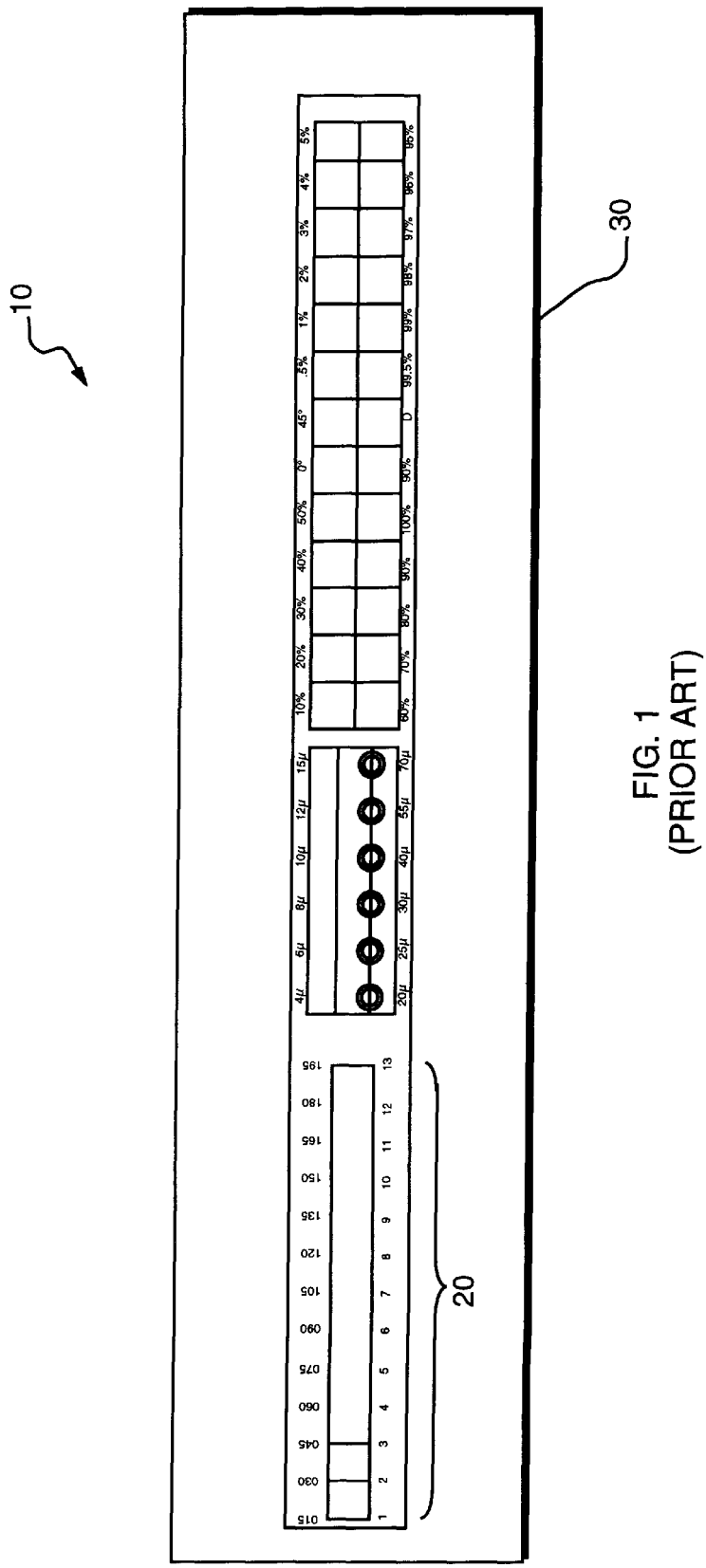
FIG. 1 is a prior art wedge of the type utilized in non-digital platemaking operations.
Figure 2:
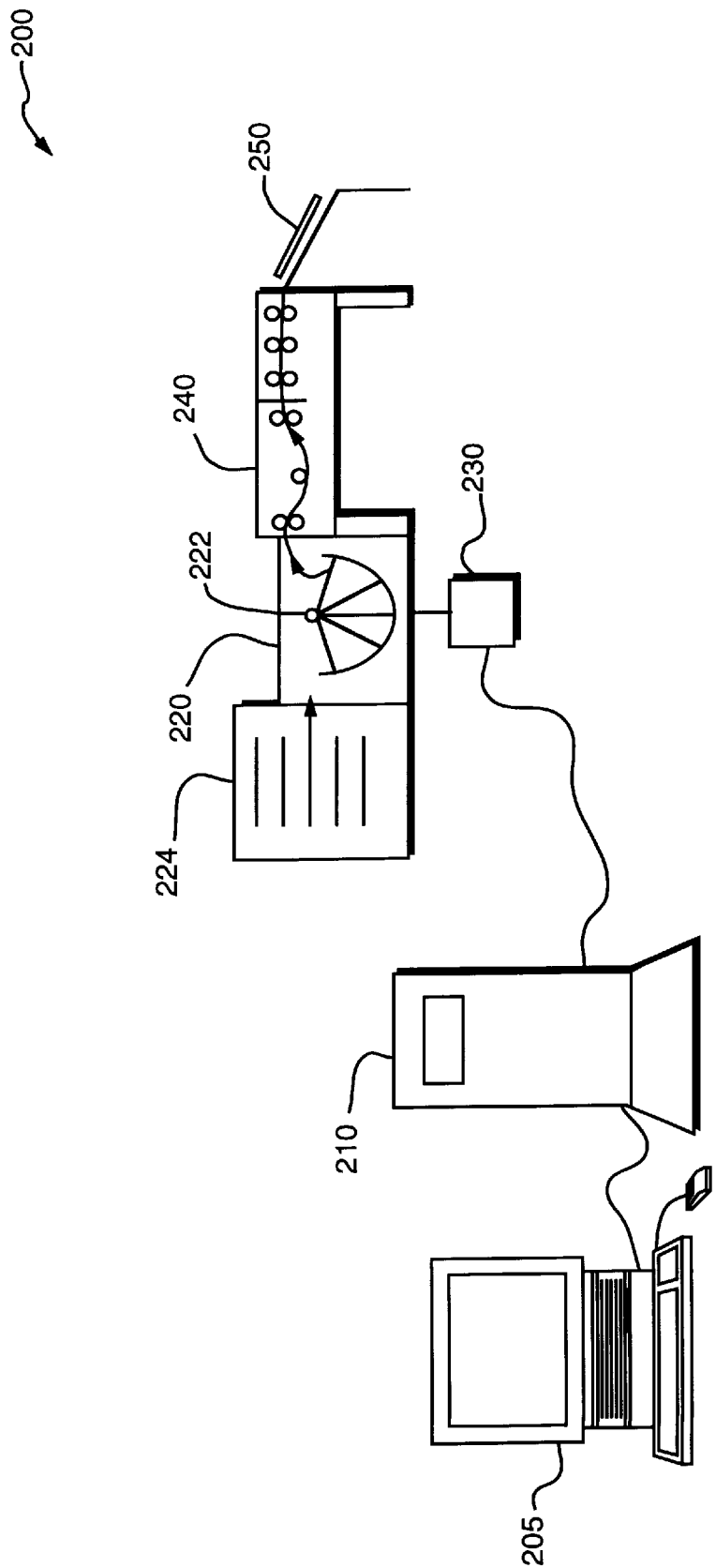
FIG. 2 depicts a digital platesetting system.

Turning now to FIG. 2, there is depicted a digital platesetting system 200 which includes an image processor 205, which may be a personal computer or high powered workstation, for laying out and editing an image to be recorded on the desired media. The processing subsystem 305 may, if desired, include a scanner for scanning a pre-existing image to read the image which is to be recorded on the media. Data representing the image is transmitted from the image processor 205 to the raster image processor (RIP) 210. The RIP 210 converts the data from the image processor 205 into instructions which can be understood by the platesetter 220.

A plate supply device 224 feeds printing plates into a cylindrical drum type platesetter or imager 220 which includes an optical scanner 222 which scans the plate to expose a desired image on the plate. The platesetter 220 is controlled by the controller 230 which receives signals from the RIP 210 and controls the exposure of the scanned light beam on the plate being imaged as well as other operational parameters of the platesetter 220. The imaged plate is fed into a plate or media processor 240 which develops or finishes the latent or patent image formed on the plate by the platesetter 220 and delivers a developed plate 250 which can be used to print the images which have been formed on the plate onto another medium such as paper.

Figure 3:
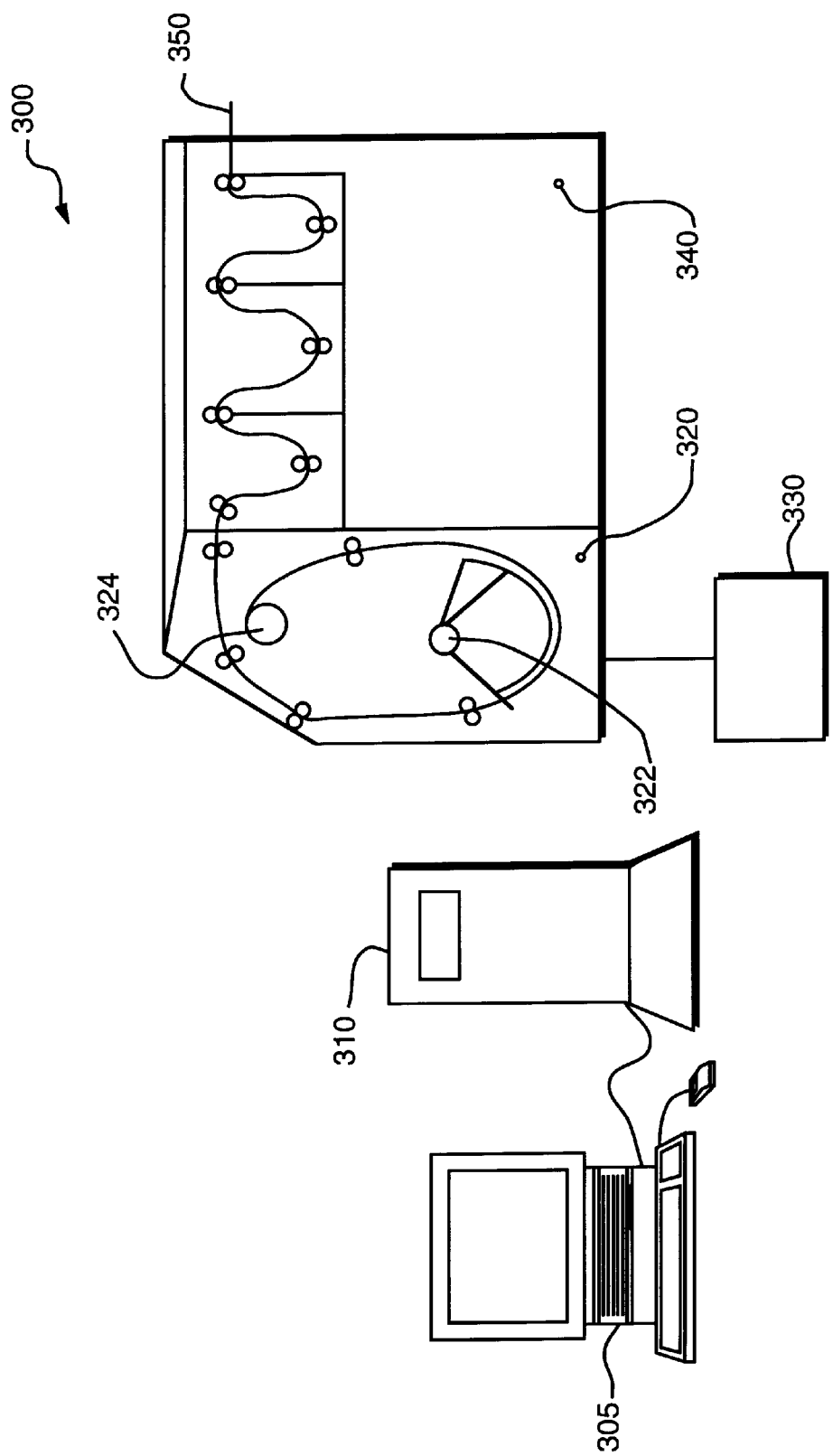
FIG. 3 depicts a digital imagesetting system.

FIG. 3 depicts a digital imagesetting system 300. The system 300 includes an image processor 305, which may be a personal computer or high powered workstation, for laying out and editing an image to be recorded on the desired media. The image processor 305 may, if desired, include a scanner for scanning a pre-existing image to read the image which is to be recorded on the media. Data representing the image is transmitted from the image processor 305 to the raster image processor (RIP) 310. The RIP 310 converts the data from the image processor 305 into instructions which will be understood by the imagesetter 320.

The imagesetter or imager 320 has a cylindrical drum and includes an optical scanner 322 for scanning media which is continuously fed from the media supply 324 to the portion of the cylindrical drum over which the scanning occurs. The imagesetter is controlled by a controller 330 which receives signals from the RIP 310 and controls the exposure of the scanned light beam on the media, along with other imagesetter operational parameters. After optically scanning the media in the cylindrical drum of the imagesetter 320, the media is fed through the media processor 340 which subjects the imaged media to development or finish processing as is well understood in the art. The finished media 350 is output from the image processor 340.

Figure 4:
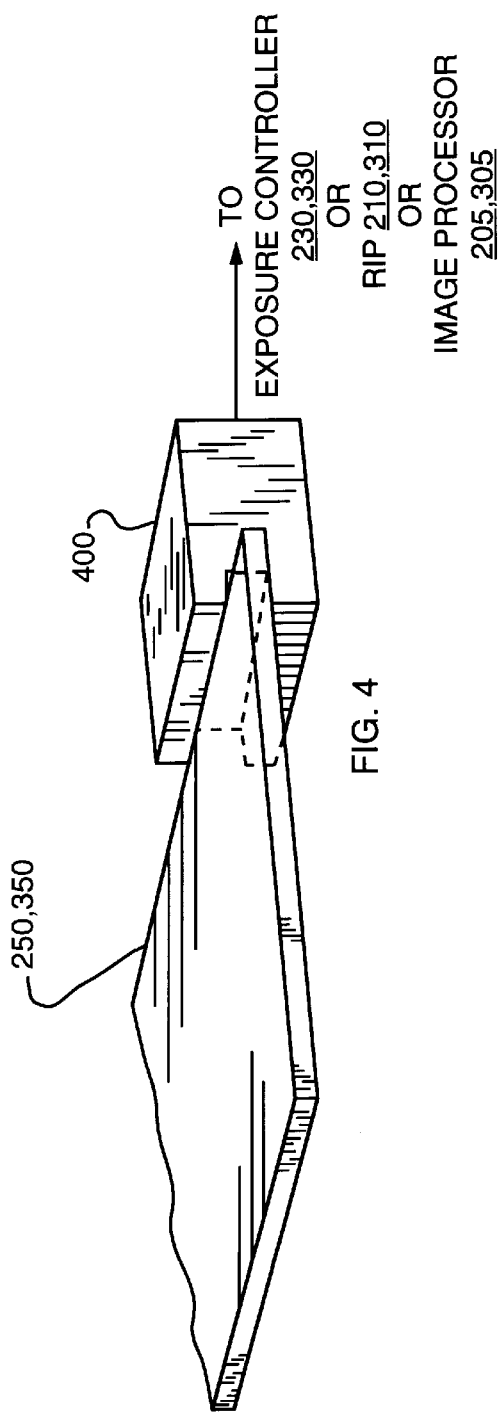
FIG. 4 depicts a densitometer which can be interconnected to the platesetting or imagesetting system of FIGS. 2 and 3.

FIG. 4 depicts the finished media 250 or 350 being automatically fed through a densitometer 400 which is disposed in the output path of the finished media. The densitometer 400 automatically detects the density of an image on the finished media 250 or 350 as it travels along its output path. The densitometer 400 is beneficially interconnected to the controller 220, 330, RIP 210, 310, or image processor 205, 305 of FIGS. 2 and 3, as applicable, so that a closed loop system is provided and the exposure can be automatically adjusted based upon the detected density of a selected portion of a control wedge formed along the edge of the finished media 250 or 350.

The densitometer 400 is preferably a reflection densitometer. The use of the density in establishing, monitoring and adjusting the exposure of the platesetter 220 or imagesetter 320 will be detailed further below. Of course, rather than using a densitometer which is arranged to detect and transmit density information back to the controller, RIP or image processor for use in automatically adjusting the platesetter or imagesetter exposure setting, a portable densitometer could be utilized by the operator to determine the density of an image on a sampling of finished media and any adjustments to the exposure setting manually inputted by the operator to the controller 230 or 330 via either an input device connected directly to the controller 230 of the platesetter or controller 330 of the imagesetter or via the input device of the image processor 205 or 305, or an input device connected to the RIP 210 or 310 of the platesetting and imagesetting systems 200 and 300 depicted in FIGS. 2 and 3.

Before detailing the control wedge which can be formed by the platesetting and imagesetting systems 200 and 300 depicted in FIGS. 2 and 3, a further description of certain patterns which can be recorded by the depicted systems will first be described.

Figure 5:
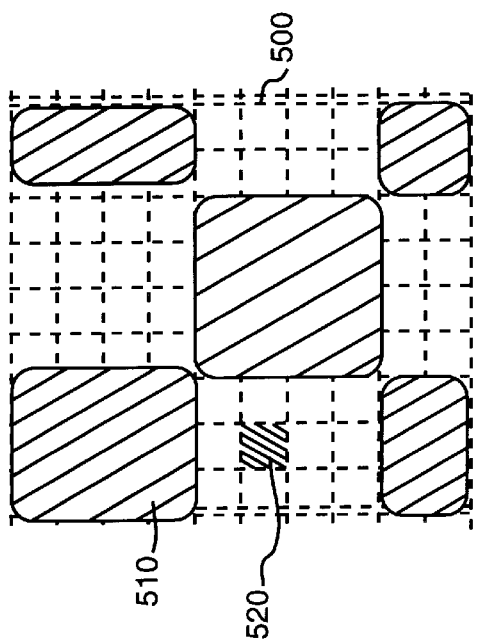
FIG. 5 depicts a halftone dot patch.

FIG. 5 is a somewhat simplified depiction of a section of a checkerboard patch 500 which is formed of halftone dots 510 which are in turn formed of a matrix of pixels. Exemplary pixel 520 is shown solely for reference purposes and would, of course, not actually be imaged at the location shown which forms part of the unrecorded space between adjacent imaged halftone dots.

FIGS. 6A–6C provide a somewhat more detailed depiction of checkerboard patches used in the control wedge in accordance with the present invention. As indicated, FIG. 6A depicts a checkerboard patch 600A which is formed of halftone dots imaged of 2×2 pixels. Hence, each dot is formed of four imaged pixels and each dot is spaced such that two pixels separate the opposed sides of adjacent dots.

FIG. 6B depicts a checkerboard patch 600B formed of dots 610B having 4×4 imaged pixels. The spacing between opposed sides of the dots 610B which are adjacent is four pixels.

Finally, in FIG. 6C a checkerboard patch 600C is depicted which includes dots 610C. The dots 610C are formed by imaging 8×8 pixels. The opposed sides of the dots 610C which are adjacent to each other are separated by eight pixels.

As can be seen from the checkerboard patches depicted in FIGS. 6A–6C, each patch 600A–600C has a nominal percent coverage or imaged area which is always 50%. Each halftone dot in each of the respective checkerboard patches 600A–600C is of the same size and consist of the same number of pixels. For example, in the checkerboard patch 600A, each halftone dot has four imaged pixels. In the checkerboard patch 600B, each halftone dot is formed of sixteen pixels. While in the checkerboard patch 600C, each of the halftone dots has sixty-four imaged pixels. This would also hold true for other halftone dot configurations. Hence, a checkerboard patch formed of one pixel would consist of halftone dots each having one imaged pixel and a checkerboard patch formed of 7×7 halftone dots would consist of halftone dots all having forty-nine imaged pixels.

As has been discussed above, the spacing of the pixels within each halftone dot is determined by the addressability of the platesetter or imagesetter. To more finely adjust the pixel size, and accordingly the size of each halftone dot, the exposure and intensity of the optical beam imaging performed within the platesetter or imagesetter and/or the degree of processing by the image processor can be adjusted. Conventional techniques for adjusting these parameters have failed to provide a simple way in which to precisely and accurately establish imaging parameters to obtain images of the desired quality on the finished media. As will be detailed below, the present invention provides a control wedge incorporating patterns which can be used to accurately and easily establish, monitor and adjust the imagesetting or platesetting to ensure proper recording of the desired image on the finished media.

Figure 7A:
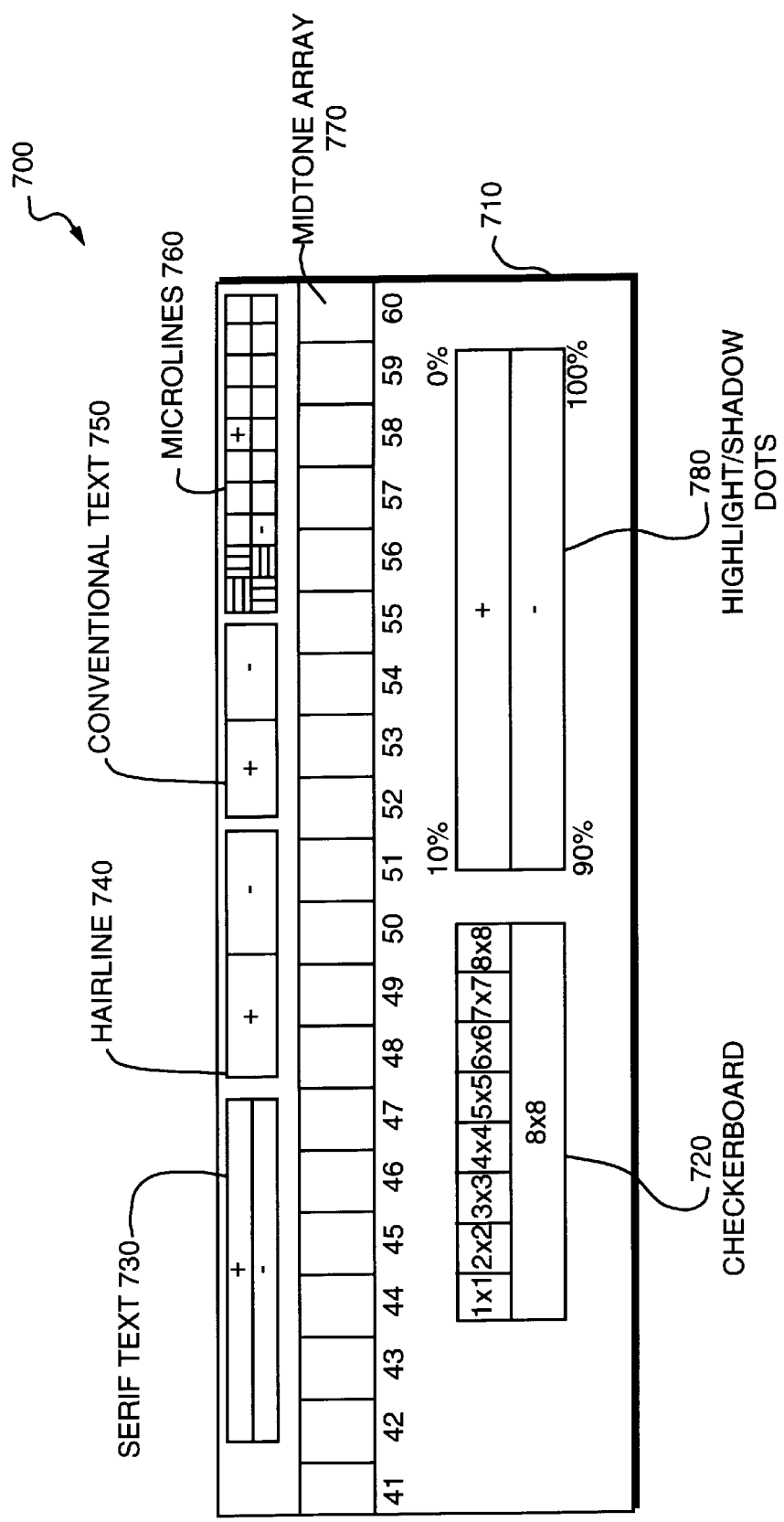
FIG. 7A is a graph showing the sensitivity of the halftone dot patches forming the checkerboard pattern of FIG. 7.
Figure 7B:
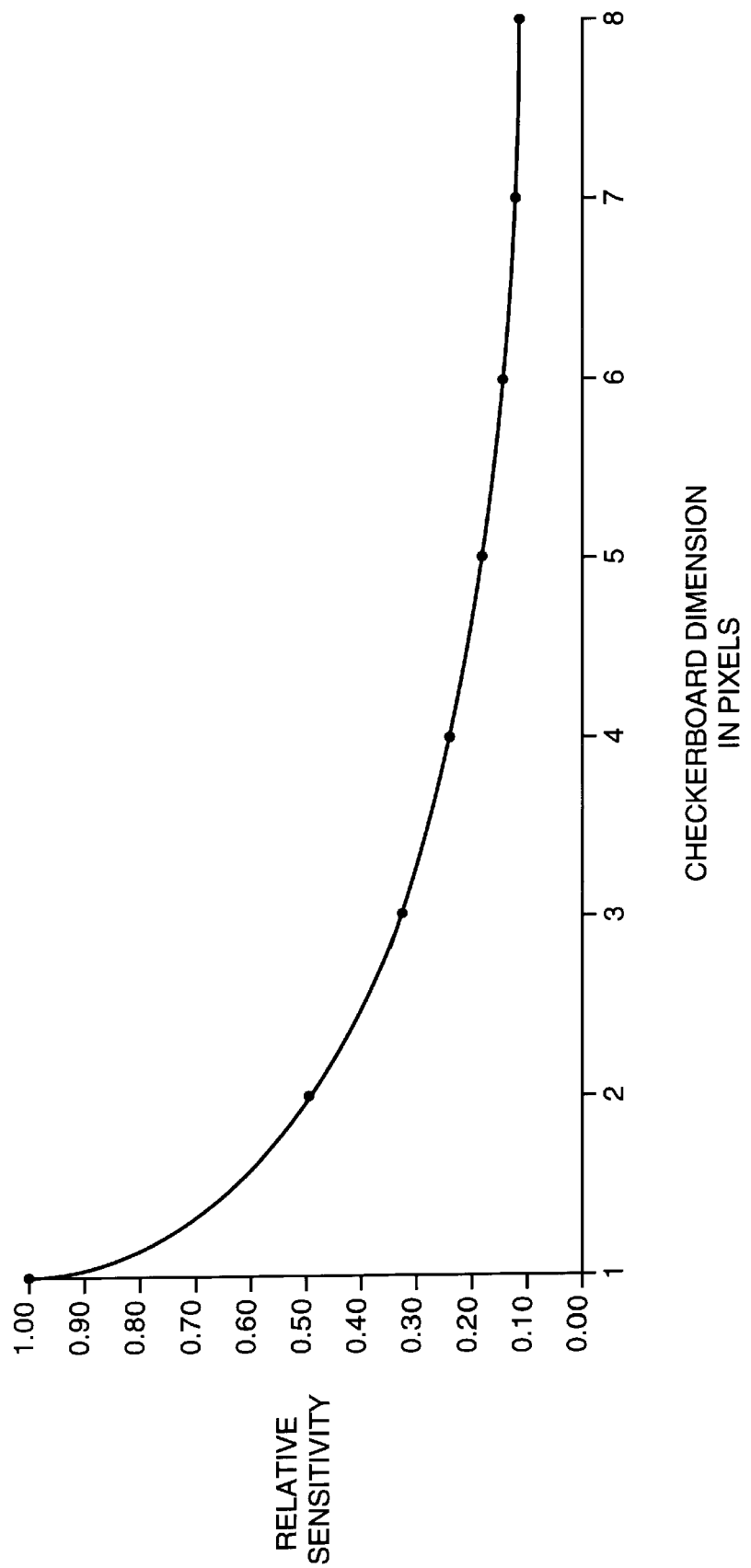
FIG. 7 is a simplified depiction of a control wedge in accordance with the present invention.

FIG. 7 depicts a control wedge in accordance with the present invention. The digital control wedge will typically reside in digital form in the platesetter or imagesetter controller 230 or 330, or image processor 205 or 305, or RIP 210, 310 of FIGS. 2 and 3. In the platesetter and imagesetter systems 200 and 300 depicted in FIGS. 2 and 3, the density and hence, the quality of a finished image on the media is affected by the operating parameters of the platesetter or imagesetter 220 or 320, and/or the media processor 240 or 340.

In accordance with the present invention, the combined affects of the imaging and processing devices can be determined using the FIG. 7 control wedge. Since these affects cannot be readily separated, the control wedge, as will be described in detail below, provides an accurate and user friendly means to establish operating parameters based upon the full system operation, and hence facilitates the establishment and adjustment of operating parameters of the imaging device based upon the operation of both the imaging and finishing devices.

In the FIG. 7 control wedge, the actual patterns in the identified areas are described textually using labels rather than by a depiction of the patterns themselves for clarity. The actual images are depicted in the array of control wedges depicted in FIG. 8. As shown in FIG. 7, the control wedge is formed of various patterns which are imaged on a selected media. It will be understood by those skilled in the art, that any combination of the disclosed patterns may be utilized. For example, in certain implementations, it may be desirable or even advantageous to limit the control wedge to, for example, a checkerboard, or a highlight/shadow dot or a midtone array pattern, or to one or more of the text, hairline or microline patterns. However, preferably, all of the patterns depicted in FIG. 7 are included in the control wedge for use in establishing and monitoring the quality images recorded on the media by the platesetter 220 or imagesetter 320 of FIGS. 2 and 3.

The depicted control wedge 700 is recorded on a media 710 and includes an array of checkerboard patches which form the checkerboard pattern 720. The size of the halftone dots forming the checkerboard patches continuously increases on a patch by patch basis from a single pixel to 8×8 pixels, as indicated. The 8×8 pixel checkerboard patch also extends adjacent to the entire row of checkerboard patches. The 1×1 checkerboard patch is the most sensitive of the imaged patches, with each consecutive patch being less sensitive than the prior adjacent patch. The 8×8 pixel patch represents the least sensitive of the imaged checkerboard patches. The least sensitive dot could, if desired, be either larger or smaller than the 8×8 pixel dot size indicated, as will be discussed further below.

The least sensitive patch corresponds to a multiple of the resolution rate of the platesetter 220 or imagesetter 320. The actual spacing of the pixels, and the course adjustment of their size, is determined by the addressability of the platesetter or imagesetter. Minor adjustments to the pixel size, and hence, the size of each halftone dot, is performed by adjusting the exposure, intensity and/or degree of processing. The control wedge 700 is advantageously used for this purpose and particularly for exposure adjustment.

The checkerboard patches forming the checkerboard pattern 720 could, of course, include halftone dots formed of more than sixty-four pixels. For example, 9×9, 10×10, etc., checkerboard patches could be included, if desired. Similarly, the checkerboard patches could be limited to dot sizes which are less than 8×8 pixels. For example, the checkerboard pattern 720 could, if desired, be limited to checkerboard patches of one pixel through 6×6 pixels. Of course, as will be recognized by those skilled in the art, other dot size ranges could also be utilized. However, preferably the smallest dot size will be a one pixel dot since this will provide the greatest sensitivity to changes in the exposure.

The patch having the largest dot size, in this case the 8×8 checkerboard patch, will beneficially extend adjacent to all other checkerboard patches. For example, if the least sensitive patch in the checkerboard pattern 720 has a dot size of 6×6 pixels, it will be that patch which extends beneath the row of checkerboard patches in a manner similar to the 8×8 pixel patch depicted in FIG. 7.

FIG. 7A indicates the relative sensitivity of the respective checkerboard patches forming the checkerboard pattern 720 of FIG. 7. As indicated, the one pixel patch has the greatest sensitivity. This is always the case because the dot is formed of only a single pixel which grows or shrinks in all directions. The 2×2 halftone dot patch is only half as sensitive as the 1×1 halftone dot patch because adjacent edges of the four pixels forming the dots of the 2×2 patch will not have an affect on the dot's overall size. Hence, as the exposure changes any expansion of adjacent sides of respective pixels forming the halftone dots of the 2×2 patch will not increase or reduce the size of the halftone dot itself, but will only increase or decrease the overlap of adjacent pixels forming the dot, or increase or decrease the empty area between the adjacent pixels. Accordingly, the 2×2 halftone dot patch is less sensitive to changes in the platesetter or imagesetter exposure setting.

As indicated in FIG. 7A, the sensitivity continues to decrease with each increase in the number of pixels forming the halftone dots making up the patch in relative proportion to the inverse of the size increase. Hence, each of the patches forming the checkerboard pattern 720 possesses a different sensitivity to changes in the exposure which is directly dependent upon and related to the number of pixels in the halftone dots forming the patch. In more practical terms, what this means is that to obtain a change in the tint of the 8×8 halftone dot patch which is perceivable to the unaided eye, a relatively large change in the exposure setting of the platesetter or imagesetter is required. On the other hand, a relatively small change in the exposure setting of the platesetter or imagesetter will result in a change in tint of the patch formed of a 1×1 halftone dot which is perceivable with the unaided eye.

The correct exposure is that at which the tint of all of the halftone dot patches forming the checkerboard pattern 720 appear equal to the unaided eye. When this criteria is met, the dot area of each of the halftone dot patches forming the checkerboard pattern will have a nominal fractional area coverage of 50% or, stated another way, a nominal dot area of 50%. The equal visual tint is reflective of all the halftone dots forming the checkerboard pattern 720 being true checkerboards and hence, being true 50% dots.

The sharpness and resolving power of the medium 710 may, however, affect the sensitivity relationship between different size dots. For example, if the medium 710 is of poor resolution quality or has characteristics which result in the relationship between images of different size dots being nonlinear, the proper exposure may occur at other than a nominal 50% density. This can, for example, be confirmed by using a densitometer of the type depicted in FIG. 4 to actually measure the density of one or more of the halftone patches of the checkerboard pattern 720 at the selected exposure. This value can then be stored in, for example, the platesetter or imagesetter controller 230, 330, RIP 210, 310 or image processor 205, 305 for continuous exposure monitoring and calibration, i.e., adjustment during subsequent production recording of images, as will be discussed further below.

Figure 8:
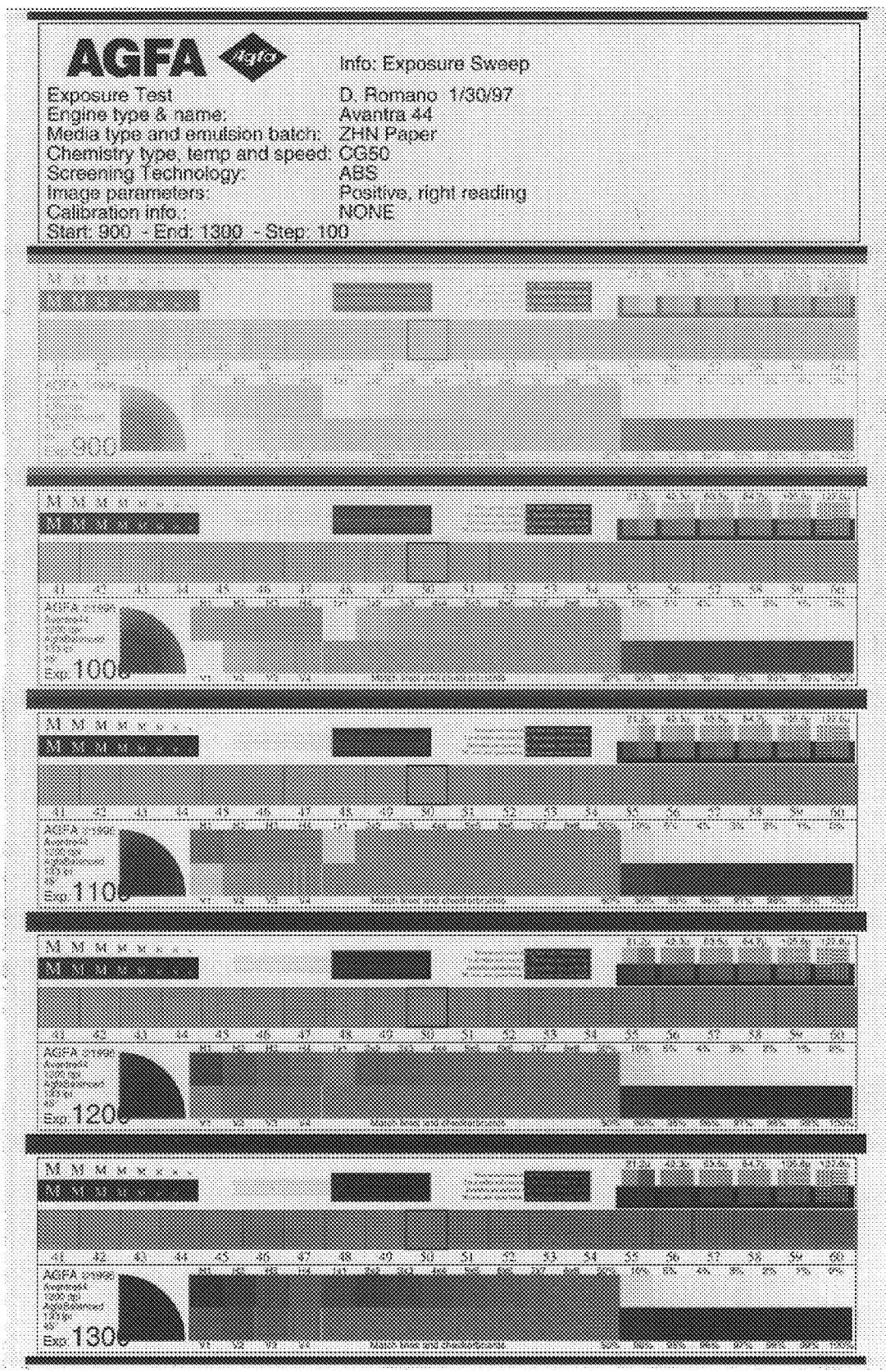
FIG. 8 depicts an array of control wedges of the type depicted in FIG. 7.

To initially establish the proper exposure, an array of the checkerboard patterns 720 at different exposures can be generated on a test medium by the platesetter 220 or imagesetter 320 and processed in the media processor 240 or 340, as applicable. Such an array is shown in FIG. 8, which is a photograph showing an array of control wedges having checkerboard patterns imaged thereon at exposures from 900 through 1300. As indicated, the visually perceivable tints of the halftone dots forming the checkerboard patches would appear to be substantially the same at an exposure lying between 1100 and 1200. A further array of control wedges, could be imaged on another piece of test media beginning at an exposure of 1100 and ending at an exposure of 1200, if desired, to determine a more exact exposure setting. However, in practice, it may be acceptable to select either exposure setting 1100, or on a best guess basis, an exposure between 1100 and 1200, for a production run of the platesetting system 200 or imagesetting system 300.

The control wedge 700 depicted in FIGS. 7 and 8 also provides other patterns which demonstrate in even more practical operational terms, the quality of the production images which can be expected at a selected exposure and hence the useability and quality of the images recorded on the medium.

Referring again to FIG. 7, the control wedge includes a serif text pattern 730 which is imaged both positively and negatively in decreasing size. Serif text, is the most difficult text to image due to the short lines stemming from and angled to the upper and lower ends of the strokes of the letters forming the text. The serif text is depicted in FIG. 8. Over or under exposure of the serif text pattern 730 will result in the serif text fattening and/or the loss of the smaller point sizes which stem from the upper and lower end of the strokes of the letters forming the text, depending on whether the positive or negative serif text images of the pattern 730 are being observed. If the quality of the serif text pattern 730 is good, the text should appear crisp and clean. Hence, by inspecting the positive and negative serif text images, an operator can easily confirm that the quality of different sizes of serif text at a selected exposure level are of satisfactory quality.

Positively and negatively imaged hairline pattern 740 is also provided as indicated in FIG. 7 and shown in FIG. 8. The hairlines forming the hairline pattern 740, as will be understood by the skilled artisan, conform to a standard 0.025 mils in thickness. These thin lines provide the operator with a clear indication of the line quality which can be expected for production images recorded on the media 710 at a selected exposure setting. More particularly, when the media is properly exposed, the line weights of the hairlines forming the hairline pattern 740 should be equal and the hairlines should be recorded as a crisp and clean image rendition.

The control wedge 700 also provides a positively and negatively imaged standard serif text pattern 750 which provides a further check and confirmation on the quality of production text imaging which can be expected at a selected exposure level. The standard serif text pattern 750 is formed by recording three point text. Reversed text can be problematic when the exposure is incorrectly set. Accordingly, the standard serif text pattern 750 provides a tool for confirming that the positive and negative three point serif text will be similar in appearance and size in a production run at a selected exposure setting. Here again, a crisp and clean image rendition is indicative of high quality imaging.

A positively and negatively imaged microline cornfield pattern 760 provides yet another check on the quality of production images which can be expected during production recording at a selected exposure setting. It should be noted that the microlines forming the microline pattern 760 are formed such that the spacing between the lines is twice the width of the lines. Accordingly, if the lines have a one pixel width, the spacing between lines is two pixels. This provides an observer with an enhanced visual perception of the quality of the microlines forming the pattern 760 over that provided by microlines having their spacing equal to their width. As indicated in FIG. 8, the microline pattern 760 is formed of various cornfields having different width microlines, the narrowest of which are 10.6 microns, i.e., one pixel in width, and the widest of which are 63.5 microns, i.e., 6 pixels in width. Of course,. other microline widths could, if desired, be utilized. Because the microlines have widths between 10 and 70 millionths of a meter, the microline pattern 760 will react to changes in the resolution setting of the platesetting or imagesetting systems 200 or 300 of FIGS. 2 and 3. For example, if the smallest mark which can be imaged is 10.6 microns at 2400 dpi, 14.1 microns at 1800 dpi and 21.1 microns at 1200 dpi, these lines are arranged in alternating horizontal and vertical rows to form the cornfield pattern 760. The lines increase in width from left to right as indicated. When the optimal exposure is achieved, the upper and lower segments of each microline patch will have the same visual tonal appearance. Additionally, the microlines will be crisp and clean.

A still further check which will provide the operator with balance information in terms of the perceivable density is provided through a midtone array pattern 770 of FIGS. 7 and 8. As indicated in FIGS. 7 and 8, the midtone array pattern 770 is formed of individual patches between a nominal 41% blackness and a nominal 60% blackness. As will be understood by those skilled in the art, this correlates respectively to an appearance of 59% blackness at the left end of the midtone array pattern and 40% blackness at the right end of the midtone array pattern 770. Hence, the midtone array pattern 770 provides the operator of the platesetter or imagesetter, or other observer, with a visual perception of the nominal 50% density in relationship to patterns having densities 10% greater or 10% less.

Hence, the midtone array pattern 770 will indicate any differences which exist between the specified and measured midtone dot area densities at a selected exposure. Linearity calibration can be utilized to correct for any discrepancies that exist to bring the specified and measured 50% dot patch into alignment. In this regard, the midtone array pattern 770 can be utilized to confirm that the 50% density patch of the midtone array which is block highlighted in FIG. 8, has an actual density of 50%, by reading the density of the nominal 50% midtone patch using, for example, the densitometer 400 depicted in FIG. 4. The actual density reading can be stored in the controller 230, 330, image processor 205, 305 or RIP 210, 310 of the platesetting system 200 and imagesetting system 300, as applicable, to be subsequently utilized in monitoring imaged media after media processing, as will be discussed further below.

The control wedge also includes a highlight/shadow dot pattern 780 as shown in FIGS. 7 and 8. As indicated, the highlight dot provides 0 to 10% reference points and the shadow dot provides reference points from 90% to 100%. When the optimal exposure is achieved, detailed dot renderings can be visually perceived from the 10% through it and 90% through 99% dot areas in the highlight/shadow dot pattern 780. A clear, crisp rendering at the intersection of the 10%, 50% and 90% areas of the dot pattern 780 provides a quick reference for visual inspection with a magnifying lupe. The density can be checked at the 0% highlight dot to confirm that the density at a selected exposure comes within the ideal maximum density ($D_{max}$) range established by the media manufacturer. In the case of the media used in the FIG. 8 photograph, the ideal $D_{max}$ range is between 1.20 and 1.22. The density can also or alternatively be checked at the 100% shadow dot to confirm that the density at the selected exposure comes with an assumed ideal minimum density ($D_{min}$) range, as will be understood by the skilled artisan. Here again, the density can be checked using the densitometer 400 depicted in FIG. 4. The actual density reading can be stored in the plate or imagesetting system controller, workstation or RIP, as appropriate, for use in future monitoring of production imaging.

If the actual density at the 0% highlight or 100% shadow dot falls outside the required $D_{max}$ or $D_{min}$ range, as applicable, for the media being imaged, the densities at the 0% highlight or 100% shadow dot of other control wedges in the control wedge array of FIG. 8 are preferably checked and the exposure setting closest to that preliminarily selected on the basis of the checkerboard pattern 720 and having a density within the required $D_{max}$ or $D_{min}$ range at the 0% highlight or 100% shadow dot area of pattern 780 is selected for the production run. Accordingly, the ultimately selected exposure will in all cases have the proper maximum density at the 0% highlight dot or minimum density at the 100% shadow dot.

In summary, the exposure of the platesetting system 200 or imagesetting system 300 is initially established by imaging an array of control wedges at different exposures. The checkerboard pattern 720 of FIG. 7 is then utilized to determine the exposure setting at which each of the patches forming the checkerboard pattern 720 are substantially equal visual tint. This exposure is preliminarily selected as the proper exposure. The serif text, hairline, conventional text, and microline patterns 730–760 are inspected visually to confirm the acceptability of the quality of imaging of these test images at the preliminarily selected exposure setting. The actual density of the 50% nominal density block of the midtone array pattern 770 is detected with a densitometer to determine the relationship between the actual density at a nominal 50% density in the midtone array 770. Finally, the density at the 0% highlight or 100% shadow dot in the highlight/shadow dot pattern 780 is read with a densitometer and compared to the required $D_{max}$ or $D_{min}$ to ensure that the actual density is within the required $D_{max}$ or $D_{min}$ range. If so, production operations may proceed at the preliminarily selected exposure setting. If not, another control wedge in the FIG. 8 array, having an exposure as close as possible to the preliminarily selected exposure and a density at the 0% highlight or 100% shadow dot of the highlight/shadow dot pattern 780 within the required $D_{max}$ or $D_{min}$ range is identified. Production operations can then proceed at this latter exposure setting. After the exposure setting has been established as described above, the quality of the recorded images can be continuously monitored and the exposure of the platesetter or imagesetter automatically adjusted as appropriate.

Figure 9:
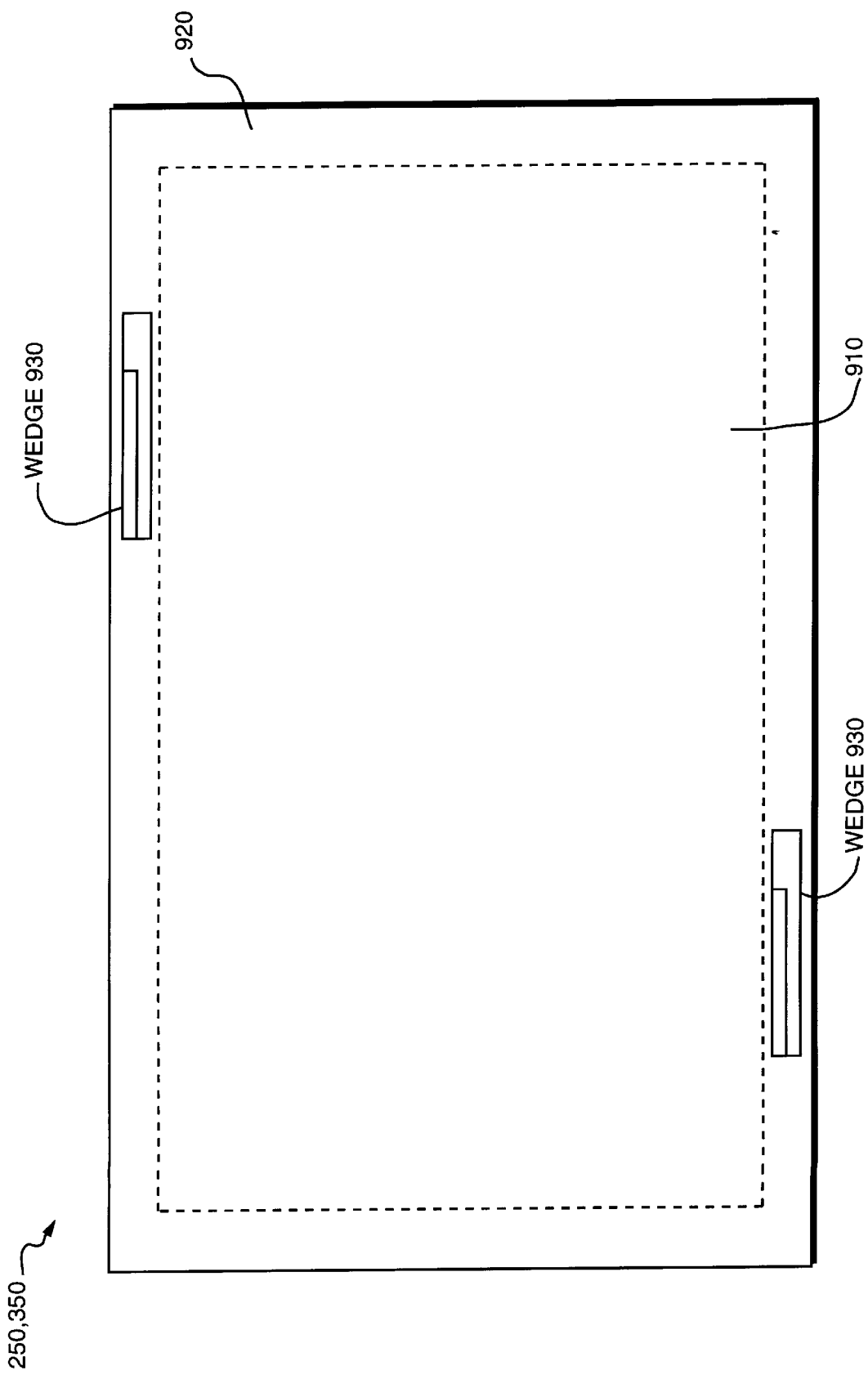
FIG. 9 depicts the use of control wedges in monitoring imaging operations in accordance with the present invention.

FIG. 9 depicts a finished medium 250 or 350 from a production run of the platesetting system 200 or imagesetting system 300 of FIGS. 2 and 3. The finished medium 250 or 350 includes an image area 910 in which the desired production images have been recorded and a border area 920 adjacent to the outer edges of the medium 250 or 350 in which one or more control wedges 930 are recorded. As discussed above, the control wedge may include all or a subset of the various patterns depicted in wedge 700 of FIG. 7 which have been described in detail above. Additionally, it should be understood that although two wedges are depicted, more or less wedges may be recorded in the border area 920 of the medium 250 or 350 as may be desirable for monitoring the quality of the finished media during production runs of the platesetter or imagesetter. The control wedges may be visually monitored by the operator in the manner described above, but will preferably will be monitored both visually by the operator and using the densitometer 400 of FIG. 4.

With respect to monitoring through the use of the densitometer 400 of FIG. 4, the finished medium 250 or 350 will be conveyed such that one or both wedges are read by a densitometer 400 to measure the density of one or more finished patterns within the wedge 930. For example, the densitometer may monitor the 0% highlight or 100% shadow dot of the highlight/shadow dot pattern 780, as discussed above with reference to FIG. 7. If the 0% highlight or 100% shadow dot of pattern 780 is used for monitoring, the density reading is compared with the pre-established $D_{max}$ or $D_{min}$ range.

Alternatively, the densitometer 400 can be used to monitor one of the patches forming the checkerboard pattern 720 depicted in FIG. 7. For example, the density of the 2×2 pixel patch or another patch making up the checkerboard pattern 720. The measured density is compared to those in a look-up table (LUT) of the type shown in FIG. 10 which can, for example, be created by reading the densities from the various control wedges 700 included in the control wedge array depicted in FIG. 8. The LUT may, for example, be stored in memory within the controller 230, 330, image processor 205, 305 or RIP 210, 310 of the platesetting system 200 or imagesetting system 300 so that by comparing the density of the finished medium detected by densitometer 400 with the densities in the LUT, the exposure can be adjusted automatically to provide the correct density for the monitored patches of the checkerboard pattern 720.

The LUT depicted in FIG. 10, lists the densities of each of the respective patches of the checkerboard pattern 720 of FIG. 7 based upon the particular exposure of the applicable control wedge in the control wedge array of FIG. 8. It will be noted that the LUT of FIG. 10 includes densities for control wedges at exposures which are not depicted in FIG. 8. The control wedges at exposures less than and greater than those indicated in FIG. 8 are not shown to avoid unnecessary redundancy. In any event, as indicated in FIG. 10, the target density for the 2×2 pixel patch of the checkerboard pattern 720 is 0.543. This will provide the correct exposure as previously determined in establishing the exposure setting prior to beginning production imaging. If, for example, the measured density of the 2×2 pixel patch of the checkerboard pattern 720 is 0.813, the exposure would be automatically corrected by the controller 230, 330, image processor 205, 305 or RIP 210, 310 of the plate or imagesetter 200, 300 to decrease the density of the 2×2 patch of the checkerboard pattern 720 imaged on subsequent production media. In this regard, the exposure might be increased or decreased from the current 1200, e.g. resetting the exposure to a 1300 setting. Subsequently, finished production media would likewise be monitored and further adjustment made to the exposure setting based upon the density of the 2×2 patch of the checkerboard pattern 720 in wedges 930 detected by the densitometer 400.

A still further alternative is to monitor the density of the 50% patch of the midtone array pattern 770 on the finished media 250 or 350. The density reading would then be compared with the density of the 50% patch detected from the control wedge of the FIG. 8 control wedge array having the exposure setting selected for production imaging.

As noted above, the density reading from the densitometer 400 of FIG. 4 is transmitted to the controller 230, 330, image processor 205, 305 or RIP 210, 310 of the imaging system 200, 300 of FIGS. 2 and 3 which, responsive thereto, adjusts the exposure as necessary to ensure that subsequently imaged production media control wedge patterns 930 include a density test patch having the proper density. It will be recognized that monitoring of the 50% patch of the midtone array pattern 770 or the 0% highlight or 100% shadow dot of the highlight/shadow dot pattern 780 provide a somewhat simplified system as compared to the monitoring of one of the patches in the checkerboard pattern 720 and utilizing a LUT of the type shown in FIG. 10 to perform the adjustment. However, the use of LUT may make it easier to obtain the correct exposure adjustment.

Figure 11:
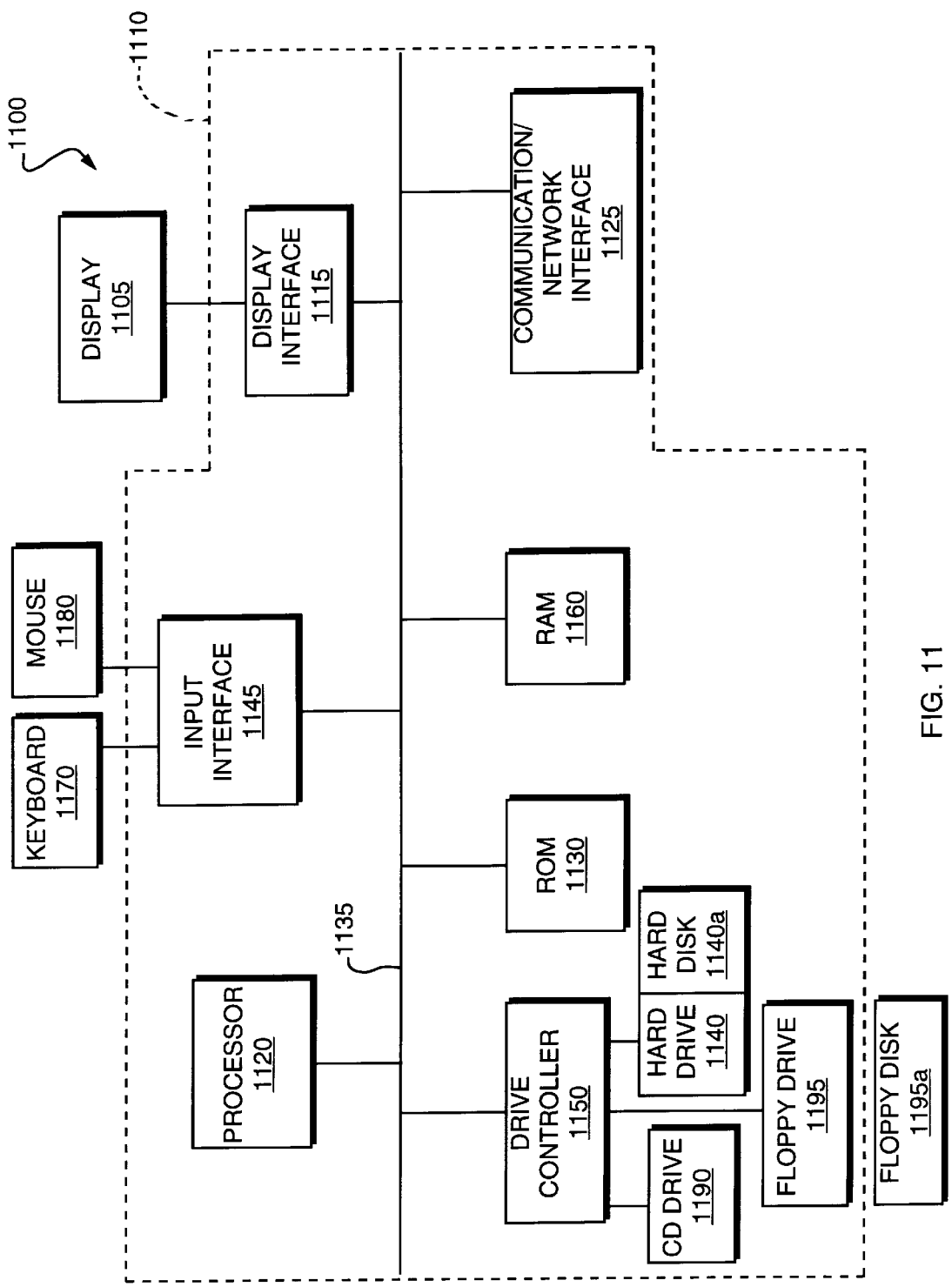
FIG. 11 is a block diagram of a processing subsystem suitable for use in recording control wedges and adjusting of the imager exposure in accordance with the present invention.

FIG. 11 depicts a block diagram of a digital processing system 1100 which may be included in the image processor 205, 305, RIP 210, 310 and/or controller 230, 330 of the imaging system 200, 300 of FIGS. 2 and 3. The system 1100 preferably utilizes commercially available components. The internal system components are generally disposed within the area 1110 and include a digital processor 1120 which could, for example, be a Pentium™ processor. Any commercially available keyboard, mouse and monitor can be utilized. A high speed communications/network interface, advantageously including a high speed modem, is preferred although not mandatory. The depicted configuration of the system 1100 is exemplary. Other components could be included if desired either in addition or alternative to those depicted. Such other components could, for example, include an optical storage device (not shown). Any number of processing system configurations could be suitable for implementing the invention so long as sufficient storage and processing capability are provided.

Each of the systems 1100 which are included in respective units of the systems 200 and 300 of FIGS. 2 and 3 will be uniquely driven to operate in accordance with the present invention. That is, the functionality of the system 1100 is based upon programming instructions which drive its operation. It will also be understood that no matter whether the system 1100 forms part of the controller 230, 330, image processor 205, 305 or RIP 210, 310, it will operate so as to drive the platesetter 210 or imagesetter 320, as applicable, to image the wedge 700 of FIG. 7, array of wedges as shown in FIG. 8, and/or wedge 900 of FIG. 9 on the medium. It will additionally be recognized by those skilled in the art that only routine programming is required to implement the necessary programming instructions. Further, because the components and configuration of the system 1100 are conventional, routine operations performed by the depicted components will generally not be described, such operations being well understood in the art.

Preferably, the system 1100 initially stores its unique programming instructions on its read only memory (ROM) 1130 or the hard disk 1140A associated with the hard drive 1140 which is controlled by drive controller 1150. The LUT, pre-established density range or 50% midtone patch density, as applicable, is preferably stored in the random access memory (RAM) 1160. During operation of the system 1100, the programming instructions and other information stored initially on the ROM or hard disk, will typically be downloaded to the RAM and accessed directly from the RAM by the processor 1120 during operations.

As shown in FIG. 11, the processor 1120 is interconnected via the bus 1135 with the CD drive 1190, floppy drive 1195 and hard drive 1140 through the drive controller 1150 and to the ROM 1130 and RAM 1160, all of which provide system storage for the programming instructions or data which will be accessed by the processor 1120. The processor 1120 is also interconnected via the bus 1135 with the keyboard 1170 and mouse 1180 via an input interface 1145 to receive operator inputs. Processor 1120 is also operatively connected to the display 1105 via a display interface 1115 to facilitate the display of information to the operator of the platesetting or imagesetting systems. The communications/network interface 1125 interconnects the processor 1120 with the densitometer 400 of FIG. 4 as has been previously discussed. The interface 1125 may also connect the system 1100 to a network as will be discussed further below.

Figure 12:
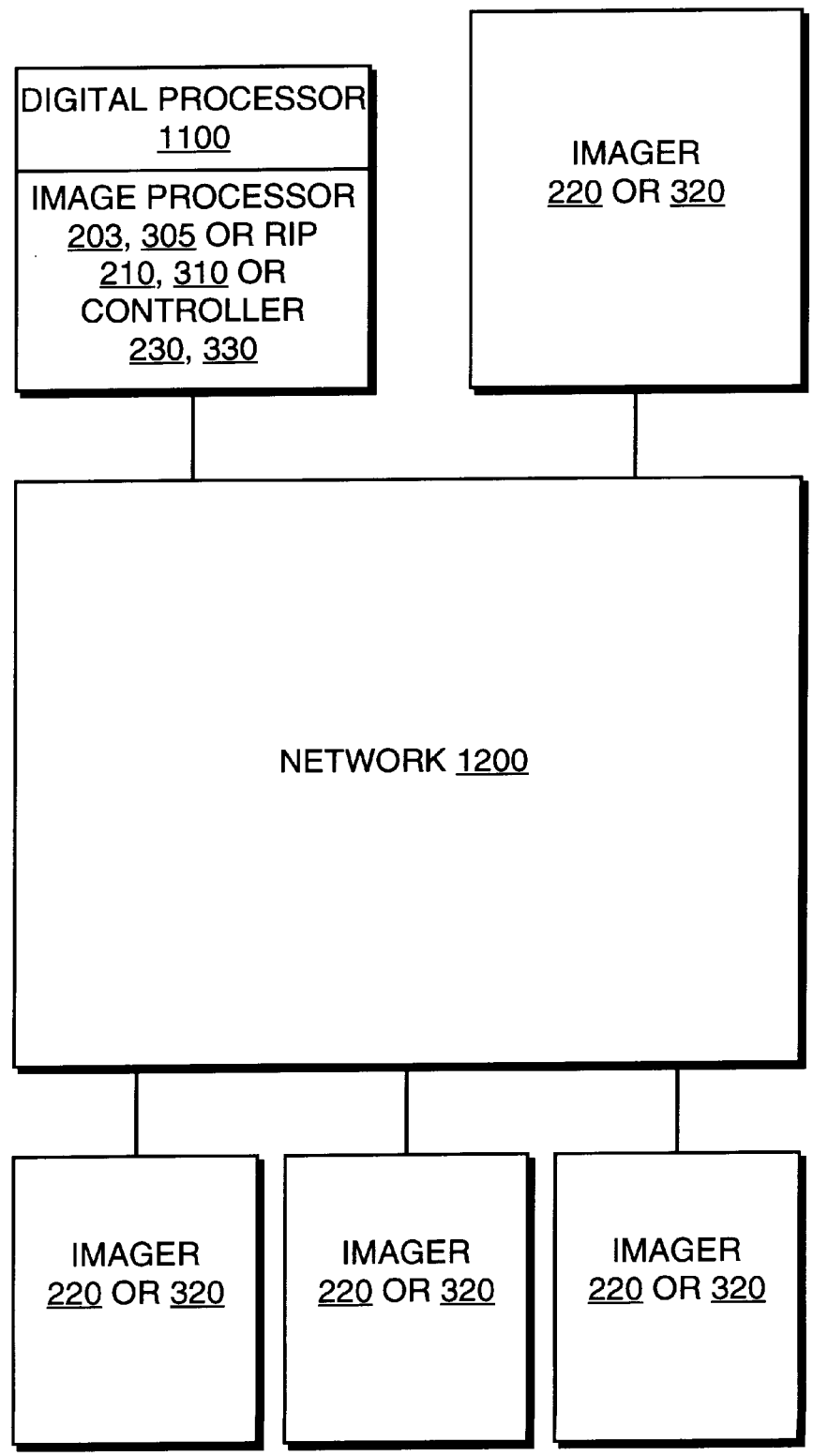
FIG. 12 depicts a networked platesetting or imagesetting system in accordance with the present invention.

As shown in FIG. 12, a network 1200 connects a controller 230, 330, image processor 205, 305 or RIP 210, 310, having a processing system 1100 included therein, to multiple platesetters 220 and/or imagesetters 320. As shown in FIG. 12, the processing system 1100 included in the controller, image processor or RIP controls the operation of multiple platesetters 220 and/or imagesetters 320 via the network 1200.

The operation of the system 1100 in driving the imaging by the platesetter 220 or imagesetter 320 of FIGS. 2 and 3 will now be described in the networked environment as shown in FIG. 12 in accordance with the present invention. The operator initializes the system 1100 by stroking the appropriate keys on the keyboard 1170 to generate a signal via the input interface 1145 and bus 1135 to the processor 1120. The operator also inputs via the keyboard 1170 an exposure range and unit steps, e.g. 5 exposure units, to be used in imaging a control wedge array. If the density to be read by the densitometer 400 is, for example, associated with the 0% highlight or 100% shadow dot of the highlight/shadow dot pattern 780, the pre-established $D_{max}$ or $D_{min}$ range for the media is also entered by the operator via the keyboard 1170 and stored by the processor 1120 on the RAM 1160. The processor 1120 in accordance with the programmed instructions stored on the ROM 1130 generates a signal which is transmitted via the bus 1135 to the communications/network interface 1125 for forwarding to the appropriate platesetter 220 or imagesetter 320. The communications/network interface 1125 transmits the signal via the network 1200 to the applicable platesetter 220 or imagesetter 320 which, responsive thereto, generates an array of wedges as described above with reference to FIGS. 7 and 8 on a medium. The imaged medium is finished in a media processor 240 or 340 and output from the imaging system 200 or 300, as applicable.

The density of one or more selected patches or patterns of one or more control wedges on the finished medium 250 or 350 may be read by the densitometer 400 of FIG. 4 as described above, and the density transmitted via the network 1200 to the network interface 1125. The density or densities are received by the processor 1120 via the bus 1135 and stored in the RAM 1160 and displayed on the display 1105. If appropriate, the processor 1120 may be driven by the instructions stored on ROM 1130 to generate a LUT of the type shown in FIG. 10 for storage on the RAM 1160 and display on display 1105. The processor may also or alternatively be driven by the stored programming instructions to compare the detected density or densities of the highlight/shadow dot to the $D_{max}$ or $D_{min}$ range. The operator examines the array of control wedges and the various density readings to select the proper exposure for the production run, as has been described in detail above. The processor may additionally or alternatively store the density of the 50% midtone patch on RAM 1160 and display the density on display 1105.

The selected exposure is entered via keyboard 1170 and stored by the processor 1120 and the RAM 1160. The operator then enters the necessary input to initiate the production run at the selected exposure. This information is conveyed via the processor 1120 through the communications/network interface 1125 over the network 1200 to the applicable platesetter 220 or imagesetter 320. Along with this instruction to initiate the operational run, the processor 1120, in accordance with the instructions stored on ROM 1130, also transmits a signal via the interface 1125 over network 1200 to the applicable platesetter 220 or imagesetter 320 to image one or more control wedges along the border of the imaged production medium, as discussed above with reference to FIG. 9.

The border control wedges are monitored both visually by the operator and using the densitometer 400 of FIG. 4. The density detected by the densitometer 400 during production is transmitted over the network 1200 from the applicable platesetter 220 or imagesetter 320 and via network interface 1125 and the bus 1135 to the processor 1120. The processor 1120 compares this information with either a LUT of the type shown in FIG. 10 which has been developed using the densities transmitted from the densitometer during the pre-production imaging of the control wedge array, or with the predetermined $D_{max}$ or $D_{min}$ range input by the operator, or with the 50% midtone patch density detected from the control wedge in the array which was exposed at the selected exposure setting to determine if adjustment to the exposure setting is required.

If so, the processor 1120 automatically transmits via the interface 1125 a control signal which is received via the network 1200 by the applicable platesetter 220 or imagesetter 320 to adjust the exposure during the subsequent production imaging of the media. Accordingly, a closed loop system is provided for automatically adjusting the exposure. Alternatively, the operator would also have the option to adjust the exposure of subsequently imaged production media by inputting a revised exposure setting via the keyboard 1170 which would be directed by the processor 1120 via the network interface 1120 to the applicable platesetter 220 or imagesetter 320.

As described in detail above, the present invention provides an improved technique for calibrating digital platesetters and imagesetters. The technique allows platesetter and imagesetter operators to simply and precisely establish the correct exposure for the imager prior to production recording of desired images on a media. The technique also allows operators to simply and precisely monitor repeatability of the platesetter or imagesetter using a familiar type tool similar to that used in non-digital platemaking. The technique helps platesetter and imagesetter operators to visually determine whether or not the exposure has been optimally adjusted and facilitates a precise determination of how close the platesetter or imagesetter exposure is to its optimum exposure setting. The technique is user friendly and facilitates the visual determination of the acceptability of characters and designs which will be recorded during production operations on a medium at a selected exposure level. The present invention also provides a platesetter or imagesetter system with automated exposure monitoring and/or control.

It will also be recognized by those skilled in the art that, while the invention has been described above in terms of a preferred embodiment(s) it is not limited thereto. Various features and aspects of the above described invention may be used individually or jointly. Further, although the invention has been described in the context of its use in particular implementation(s) and environment(s), those skilled in the art will recognize that the present invention can be beneficially utilized in other implementations and environments. Accordingly, the claims set forth below should be construed in view of the full breath and spirit of the invention as disclosed herein.

What is claimed is:

1. An article of manufacture, comprising:
    a medium;
    a plurality of checkerboard patches recorded on said medium, each of said patches being of equal nominal tint and being formed of dots, the dots of each of said patches being of equal nominal size with the size being different from that of the dots forming all other of said patches, and one of said patches being arranged adjacent to all other of said patches.

2. An article of manufacture according to claim 1, wherein the size of the dots of the one patch are larger than the size of the dots of all other patches.

3. An article of manufacture according to claim 2, wherein the size of the dots of another of said patches is one pixel.

4. An article of manufacture according to claim 1, wherein the plurality of patches are arranged in a row and the one patch is disposed along a length of said row adjacent to all other patches.

5. An article of manufacture according to claim 4, wherein a first of the patches in said row is formed of dots one pixel in size and each of the other patches in said row are respectively formed of dots the size of which exceeds the size of the dots of the prior patch in said row.

6. An article of manufacture according to claim 4, wherein a first of the patches in said row is formed of dots the size of which is one pixel and each of the other patches in said row are respectively formed of dots the size of which exceeds the size of the dots of the prior patch in said row by one pixel in each of two orthogonal directions.

7. A method for calibrating a digital imager, comprising the steps of:
    forming first dots of equal nominal size on a medium to create a first checkerboard patch having a nominal tint;
    forming second dots of equal nominal size on the medium to create a second checkerboard patch having the nominal tint, the size of the second dots being larger than the size of the first dots and the second patch being arranged adjacent to the first patch;
    adjusting the exposure of the imager such that a tint of the second patch is substantially identical to a tint of the first patch.

8. A method according to claim 7, wherein the nominal tint is 50%.

9. A method according to claim 7, wherein the size of each of the first dots is one pixel.

10. A method according to claim 7, further comprising the step of forming third dots of equal nominal size on the medium to create a third checkerboard patch having the nominal tint, the size of the third dots being larger than the size of the first dots and smaller than the size of the second dots, and the third patch being arranged adjacent to the first patch;
    wherein the patches are disposed in a row with the third patch positioned between the first patch and the second patch, and the second patch further extending along a length of said row.

11. A method according to claim 10, wherein the first patch is disposed at one end of said row and each of the first dots is one pixel in size and the second patch is disposed at the other end of said row.

12. A method according to claim 10, wherein the size of each of the first dots is one pixel and the size of each of the third dots is two pixels by two pixels and the size of each of the second dots is greater than two pixels by two pixels.

13. A method according to claim 7, wherein the size of each of the dots of the second patch corresponds to a fixed parameter of the imager.

14. A method according to claim 13, wherein the fixed parameter is a multiple of a resolution rate of the imager.

15. A method according to claim 7, wherein the second patch is less sensitive to exposure variations than the first patch.

16. A method for establishing a digital imager exposure setting, comprising the steps of:
    operating the imager at a first exposure setting to create a first control wedge on a medium including a first checkerboard patch formed of first dots of equal nominal size and having a nominal tint, and a second checkerboard patch formed of second dots of equal nominal size with the size being larger than that of the first dots and having the nominal tint;

operating the imager at a second exposure setting to create a second control wedge on the medium including a third checkerboard patch formed of the first dots and having the nominal tint, and a fourth checkerboard patch formed of the second dots and having the nominal tint;

determining which of the first exposure or the second exposure is a preferred exposure of the imager based upon a comparison of a tint of the second patch with a tint the first patch and a comparison of a tint of the fourth patch with a tint the third patch.

17. A method according to claim 16, wherein the preferred exposure is determined to be the first exposure if the tint of the second patch and the tint of the first patch are more closely matched than the tint of the fourth patch and the tint of the third patch.

18. A method according to claim 17, further comprising the step of determining that the preferred exposure is a proper exposure if the tint of the first patch visually matches the tint of the second patch.

19. A method according to claim 16, wherein the size of each of the second dots corresponds to a multiple of a resolution rate of the imager and the size of each of the first dots is one pixel.

20. A method according to claim 16, wherein:

the first control wedge includes a fifth checkerboard patch, arranged between the first and the second patches in a first row of patches, formed of third dots of equal nominal size with the size being larger than that of the first dots and smaller than that of the second dots and having the nominal tint;

the second control wedge includes a sixth checkerboard patch, arranged between the third and the fourth patches in a second row of patches, formed of the third dots and having the nominal tint;

the second patch extends along a length of said first row so as to be adjacent to all other patches within the first row; and the fourth patch extends along a length of said second row so as to be adjacent to all other patches in the second row.

21. A method according to claim 20, wherein the size of each of the first dots is one pixel and the size of each of the third dots is two pixels by two pixels and the size of each of the second dots is greater than two pixels by two pixels.

22. An article of manufacture, comprising:

a medium;

a plurality of patterns recorded on said medium, said plurality of patterns being selected from a group of patterns consisting of a serif text pattern having a single character represented in multiple different sizes, a hairline pattern, a midtone array pattern, and a checkerboard pattern having multiple different size patches of equal density.

23. An article of manufacture according to claim 22, wherein said plurality of patterns includes all of the patterns in said group of patterns.

24. An article of manufacture according to claim 22, wherein said plurality of patterns includes a microline pattern with microlines having a one pixel width and two pixel spacing between microlines.

25. An article of manufacture according to claim 22, wherein the plurality of patterns includes positively and negatively imaged patterns.

26. A method for calibrating an imager, comprising the steps of:

forming a first plurality of patterns on a medium at a first exposure, said first plurality of patterns being selected from a group of patterns consisting of a serif text pattern, a hairline pattern, a microline pattern, a midtone array pattern, a highlight/shadow dot pattern and a checkerboard pattern;

forming a second plurality of patterns on the medium at a second exposure, said second plurality of patterns being in a form identical to that of the first plurality of patterns;

visually comparing said first plurality of patterns with said second plurality of patterns; and selecting either the first exposure or the second exposure for imaging based upon the visual comparison.

27. An article of manufacture, comprising:

a medium;

a plurality of patches recorded on said medium, each of said plurality of patches being a checkerboard patch of equal nominal tint and being formed of dots, the dots of each of said plurality of patches being of equal nominal size with the size being different from that of the dots forming all other of said plurality of patches, and one of said plurality of patches being arranged adjacent to all other of said plurality of patches; and a plurality of patterns recorded on said medium, said plurality of patterns including at least one of a serif text pattern, a hairline pattern, a microline pattern and a midtone array pattern.

28. An article of manufacture according to claim 27, wherein the plurality of patterns includes positively and negatively imaged patterns.

29. An article of manufacture according to claim 27, wherein:

said plurality of patterns recorded on said medium includes an additional pattern having one of highlight dots or shadow dots.

30. An article of manufacture according to claim 29, wherein the additional pattern includes one of a highlight dot or a shadow dot suitable for checking a maximum or minimum density of an image recorded on the recording medium.

31. A method for calibrating an imager, comprising the steps of:

recording a first control wedge on a medium, at a first exposure, the first control wedge including (i) a plurality of patches, each of said plurality of patches being a checkerboard of equal nominal tint and being formed of dots, the dots of each of said plurality of patches being of equal nominal size with the size being different from that of the dots forming all other of said plurality of patches, and one of said plurality of patches being arranged adjacent to all other of said plurality of patches, and (ii) a plurality of patterns, said plurality of patterns including at least one of a serif text pattern, a hairline pattern, a microline pattern and a midtone array pattern, and (iii) a highlight/shadow dot pattern;

recording a second control wedge on the medium, at a second exposure, the second control wedge including the plurality of patches and the plurality of patterns;

comparing a tint of the one of said plurality of patches with that of all other of said plurality of patches recorded in the first control wedge;

comparing a tint of the one of said plurality of patches with that of all other of said plurality of patches recorded in the second control wedge;

preliminarily selecting the first exposure if the tint of the one of said plurality of patches matches the tint of all other of said plurality of patches recorded in the first control wedge more closely than the tint of the one of said plurality of patches matches the tint of all other of said plurality of patches recorded in the second control wedge;

determining a density of an area within said highlight/shadow dot pattern to identify a maximum or minimum density of an image recorded on the medium at the first exposure; and visually inspecting said plurality of patterns in the first control wedge to confirm acceptability of the first exposure.

32. An imaging system, having an image processor for editing an image to be recorded, a raster image processor for converting data from the image processor, and an imager controlled by a controller for exposing a medium in accordance with the converted data to record the image comprising:

a memory device configured to store a set of instructions, and a digital processor associated with said imager and interconnected to the memory device which is configured to generate, in accordance with said stored instructions, a signal responsive to which said imager exposes the medium to record a plurality of patches on the medium, each of said plurality of patches being a checkerboard of equal nominal tint and being formed of dots, the dots of each of said plurality of patches being of equal nominal size with the size being different from that of the dots forming all other of said plurality of patches, and one of said plurality of patches being arranged adjacent to all other of said plurality of patches.

33. An imaging system according to claim 32, wherein said digital processor, in accordance with said stored instructions, is further configured to generate a second signal responsive to which said imager exposes the medium to record a plurality of patterns, the plurality of patterns including at least one of a serif text pattern, a hairline pattern, a microline pattern and a midtone array pattern, on said medium.

34. An imaging system according to claim 33, wherein said digital processor is further configured to generate, in accordance with said stored instructions, a third signal responsive to which said imager exposes the medium to record a highlight/shadow dot pattern on said medium.

35. An imaging system according to claim 34, further comprising:

a densitometer configured to detect a density of one of the plurality of patches and the plurality of patterns;

wherein the digital processor is configured to generate, in accordance with the stored instructions, a fourth signal to change an exposure setting of the imager based upon the detected density.

36. An imaging system according to claim 32, wherein said digital processor, in accordance with said stored instructions, is further configured to generate a second signal responsive to which said imager exposes the medium to record a highlight/shadow dot pattern on the medium.

37. An imaging system according to claim 32, further comprising:

a media processor configured to develop the exposed medium such that said plurality of patches on the developed medium are indicative of the combined operation of the imager and the media processor.

38. An imaging system according to claim 32, wherein said medium is one of a plate, a film and a paper medium.

39. An imaging system according to claim 32, wherein said digital processor is interconnected to a network and said signals are transmitted to the imager over said network.

40. An article of manufacture for imaging on a recording medium, comprising:

computer readable storage medium; and computer programming stored on said storage medium;

wherein said stored computer programming is configured to be readable from said computer readable storage medium by a computer and thereby cause said computer to operate so as to:

generate a first signal responsive to which an imager exposes a medium to record a plurality of patches thereon, each of said plurality of patches being a checkerboard of equal nominal tint and being formed of dots, the dots of each of said plurality of patches being of equal nominal size with the size being different from that of the dots forming all other of said plurality of patches, and one of said plurality of patches being arranged adjacent to all other of said plurality of patches.

41. An article of manufacture for imaging on a recording medium according to claim 40, wherein said stored computer programming is configured to be readable from said computer readable storage medium by the computer to thereby cause said computer to operate so as to:

generate a second signal responsive to which the imager exposes the medium to record a plurality of patterns on said medium, said plurality of patterns including at least one of a serif text pattern, a hairline pattern, a microline pattern and a midtone array pattern.

42. An article of manufacture for imaging on a recording medium according to claim 41, wherein said stored computer programming is configured to be readable from said computer readable storage medium by the computer to thereby cause said computer to operate so as to:

generate a third signal responsive to which the imager exposes the medium to record one of a highlight dot pattern and a shadow dot pattern on said medium.

43. A programmed computer for imaging on a recording medium, comprising:

a processor configured to generate a first signal responsive to which an imager exposes a medium to record a plurality of patches thereon, each of said plurality of patches being a checkerboard of equal nominal tint and being formed of dots, the dots of each of said plurality of patches being of equal nominal size with the size being different from that of the dots forming all other of said plurality of patches, and one of said plurality of patches being arranged adjacent to all other of said plurality of patches; and storage medium configured to store information indicative of each said checkerboard patch, the nominal dot size for each of said checkerboard patch and the arrangement of checkerboard patches to be recorded.

44. A programmed computer for imaging on a recording medium according to claim 43, wherein:

said processor is further configured to generate a second signal responsive to which the imager exposes the medium to record a plurality of patterns on said medium, said plurality of patterns being in the form of at least one of a serif text pattern, a hairline pattern, a microline pattern and a midtone array pattern; and the storage medium is further configured to store information indicative of the serif text pattern, the hairline pattern, the microline pattern and the midtone array pattern to be recorded.

45. A programmed computer for imaging on a recording medium according to claim 44, wherein:

said processor is further configured to generate a third signal responsive to which the imager exposes the medium to record a highlight/shadow dot pattern on said medium; and the storage medium is further configured to store information indicative of the highlight/shadow dot pattern to be recorded.

46. A programmed computer for imaging on a recording medium according to claim 43, wherein:

the processor forms part of a raster image processor interconnected to said imager.

47. A programmed computer for imaging on a recording medium according to claim 43, wherein:

the processor forms part of a controller configured to control the imager.

48. A programmed computer for imaging on a recording medium according to claim 43, wherein:

the processor forms part of an image processor interconnected to said imager.

* * * * *